US012203439B2

(12) United States Patent
Wadsworth

(10) Patent No.: US 12,203,439 B2
(45) Date of Patent: Jan. 21, 2025

(54) OCEAN WAVE AND TIDAL CURRENT ENERGY CONVERSION SYSTEM

(71) Applicant: Ray Wadsworth, Oakley, ID (US)

(72) Inventor: Ray Wadsworth, Oakley, ID (US)

( * ) Notice: Subject to any disclaimer, the term of this patent is extended or adjusted under 35 U.S.C. 154(b) by 0 days.

(21) Appl. No.: 18/779,353

(22) Filed: Jul. 22, 2024

(65) Prior Publication Data

US 2024/0376856 A1 Nov. 14, 2024

Related U.S. Application Data

(63) Continuation-in-part of application No. 18/637,088, filed on Apr. 16, 2024, now Pat. No. 12,092,066, which is a continuation-in-part of application No. 18/369,581, filed on Sep. 18, 2023, which is a continuation-in-part of application No. 18/140,740, filed on Apr. 28, 2023, now Pat. No. 11,788,503.

(60) Provisional application No. 63/438,455, filed on Jan. 11, 2023.

(51) Int. Cl.
*F03B 13/14* (2006.01)
*F03B 13/26* (2006.01)
*F03B 15/04* (2006.01)

(52) U.S. Cl.
CPC .............. *F03B 13/14* (2013.01); *F03B 13/26* (2013.01); *F03B 15/04* (2013.01)

(58) Field of Classification Search
CPC .......... F03B 13/00; F03B 13/14; F03B 13/26; F03B 13/264; F03B 15/00; F03B 15/04; F03B 17/00; F03B 17/06; F03B 17/063
USPC .............................................................. 416/6
See application file for complete search history.

(56) References Cited

U.S. PATENT DOCUMENTS 7,223,137 B1 * 5/2007 Sosnowski ............ F03B 17/063 440/3
7,855,468 B2 12/2010 Lin
8,277,168 B2 * 10/2012 Jack ...................... F03B 17/063 416/85
8,933,575 B2 1/2015 Lipman
9,534,579 B2 * 1/2017 Van Rompay ........ F03B 17/063
10,060,407 B2 8/2018 Elefant et al.
2008/0231057 A1 9/2008 Zeuner
2010/0172698 A1 7/2010 Ives et al.

* cited by examiner

*Primary Examiner* — Lars A Olson

(57) ABSTRACT

An ocean wave and tidal current energy conversion system includes a first vessel and a second vessel, the first vessel being parallel and spaced apart from the second vessel. The first and second vessels include supports that receive cylinders that rotate from ocean waves and currents to create hydraulic oil pressure via hydraulic cylinders. The hydraulic oil in the energy conversion system is pumped into a pressure accumulator that removes hydraulic surges and operates an electric generator. The electric generator may power an electrolysis batch system for the production of hydrogen that fills each vessel with hydrogen gas.

19 Claims, 31 Drawing Sheets

OCEAN WAVE AND TIDAL CURRENT ENERGY CONVERSION SYSTEM

CROSS-REFERENCE TO RELATED APPLICATIONS

This application is a continuation-in-part of U.S. Non-Provisional patent application Ser. No. 18/637,088, filed on Apr. 16, 2024, which is a continuation-in-part of U.S. Non-Provisional patent application Ser. No. 18/369,581, filed on Sep. 18, 2023, which is a continuation-in-part of U.S. Non-Provisional patent application Ser. No. 18/140,740, filed on Apr. 28, 2023, granted Oct. 17, 2023, U.S. Pat. No. 11,788,503, which claims the benefit of U.S. Provisional Application Ser. No. 63/438,455, filed on Jan. 11, 2023, all of which are incorporated herein by reference.

TECHNICAL FIELD

The present disclosure relates to a system to convert ocean wave and tidal current energy. More particularly, the present disclosure relates to a system to convert ocean wave and tidal current energy into hydrogen.

BACKGROUND

Energy production is essential to modern life. As we progress as a society, clean energy has become an important endeavor for many countries. Accordingly, many have turned to solar or windmills to receive necessary power. However, this type of clean energy is often ineffective and does not produce the desired results. Another source of potential energy collection is found in the ocean. The ocean covers the majority of earth and is constantly moving in the form of waves and current. This movement is produced by wind and tide from lunar cycles. With the constant movement of the ocean, there is a lot of potential energy that could be utilized.

Some have attempted to harness the power found in the ocean, but all too often these processes and systems are expensive. Not only are these processes and systems expensive, but many of them have a large carbon footprint and are inefficient in producing energy. Components to form these systems can be difficult to find, making them expensive. These systems may have difficulty being mass produced and, thus, lack availability to people around the world.

Accordingly, there is a need for a system that converts energy from ocean waves and currents to hydrogen in an efficient, inexpensive, and clean manner. The present invention seeks to solve these and other problems.

SUMMARY OF EXAMPLE EMBODIMENTS

In one embodiment, an ocean wave and tidal current energy conversion system (hereinafter referred to as the "energy conversion system") comprises a first vessel (e.g., pressure tank) and a second vessel (e.g., pressure tank), the first vessel being parallel and spaced apart from the second vessel. The first vessel may comprise a plurality of frame members coupleable to an upper surface and lower surface of both the first and second vessels. Further, the first and second vessels may be positioned with a first and second anchor so as to be facing the waves or current in a pitch position.

The frame members are positioned so as to receive supports that couple the first vessel to the second vessel. Each of the supports comprise arms to receive cylinders. The energy conversion system may comprise numerous cylinders with fins that rotate with the ocean waves or currents. Some cylinders may be coupled to the arms of the supports. The energy conversion system may comprise a third vessel and a fourth vessel, both of which may be shorter than the first and second vessels. The third and fourth vessels may be positioned between the first and second vessels, being parallel thereto. The third and fourth vessels may be rotatably coupled to the first and second vessels via an axle.

Positioned between the third and fourth vessels may be additional cylinders with fins, which may be rotatably coupled to these cylinders. The third and fourth vessels may have a teeter totter effect on the axle due to swells on the ocean. The third and fourth vessels are spread apart to maximize the roll effect from average wave action. This will allow the axle to rotate back and forth, which allows relative motion energy to be transferred to create hydraulic oil pressure via hydraulic cylinders. In addition, due to the fins on the cylinders, the cylinders can rotate, which creates rotational energy that may be configured to operate rotary hydraulic pumps that would also contribute hydraulic oil flow and pressure.

The energy conversion system may also comprise a housing that rests on and is secured to one of the supports. The housing may receive mechanical and electrical components.

In some embodiments, the hydraulic oil in the energy conversion system is pumped into a pressure accumulator that removes hydraulic surges and operates an electric generator. The electric generator may power an electrolysis batch system for the production of hydrogen that fills each vessel with hydrogen gas. The configuration of the energy conversion system, in addition to the anchors, allows the system to be aligned with the oncoming waves so as to maximize efficiency of the system. Waves and tidal currents translate into transferred hydraulic pressure and flow via the system. With the pressure and flow, the generators can produce electricity. Then the electricity can be used to produce hydrogen.

In one embodiment, an energy conversion system comprises a first vessel and a second vessel. A first support may be positioned at a first end of the first and second vessels. A second support may be positioned at a second end of the first and second vessels. Positioned between and coupled to the first and second supports is a turbine that creates energy from ocean and river current.

In one embodiment, an energy conversion system comprises a first vessel and a second vessel. Proximate the first vessel, there may be a first support and a second support. Proximate the second vessel, there may be a third support and a fourth support. The first, second, third, and fourth supports may couple to the first and second vessels via a first axle, a second axle, and a third axle. A first member, a second member, a third member, and a fourth member may be coupled to and interposed between the second and fourth supports. The first axle, second axle, and third axle may rotate back and forth (e.g., teeter totter motion), which allows relative motion energy to be transferred so as to create hydraulic oil pressure via the hydraulic cylinders.

In one embodiment, an energy conversion system may comprise a first vessel and a second vessel on a first side and a third vessel and a fourth vessel on a second side. The first and second vessels may create a first unit, and the third and fourth vessels may create a second unit. Interposed between the first and second vessels may be a plurality of first turbines and a plurality of first supports. In addition, interposed between the third and fourth vessels may be a plurality of second turbines and a plurality of second supports. The first unit and second unit may both be hingedly coupled to a first member. The first and second units may be in a first position when being towed and then moved to a second position when placed in a water source.

DETAILED DESCRIPTION OF EXAMPLE EMBODIMENTS

Figure 1:
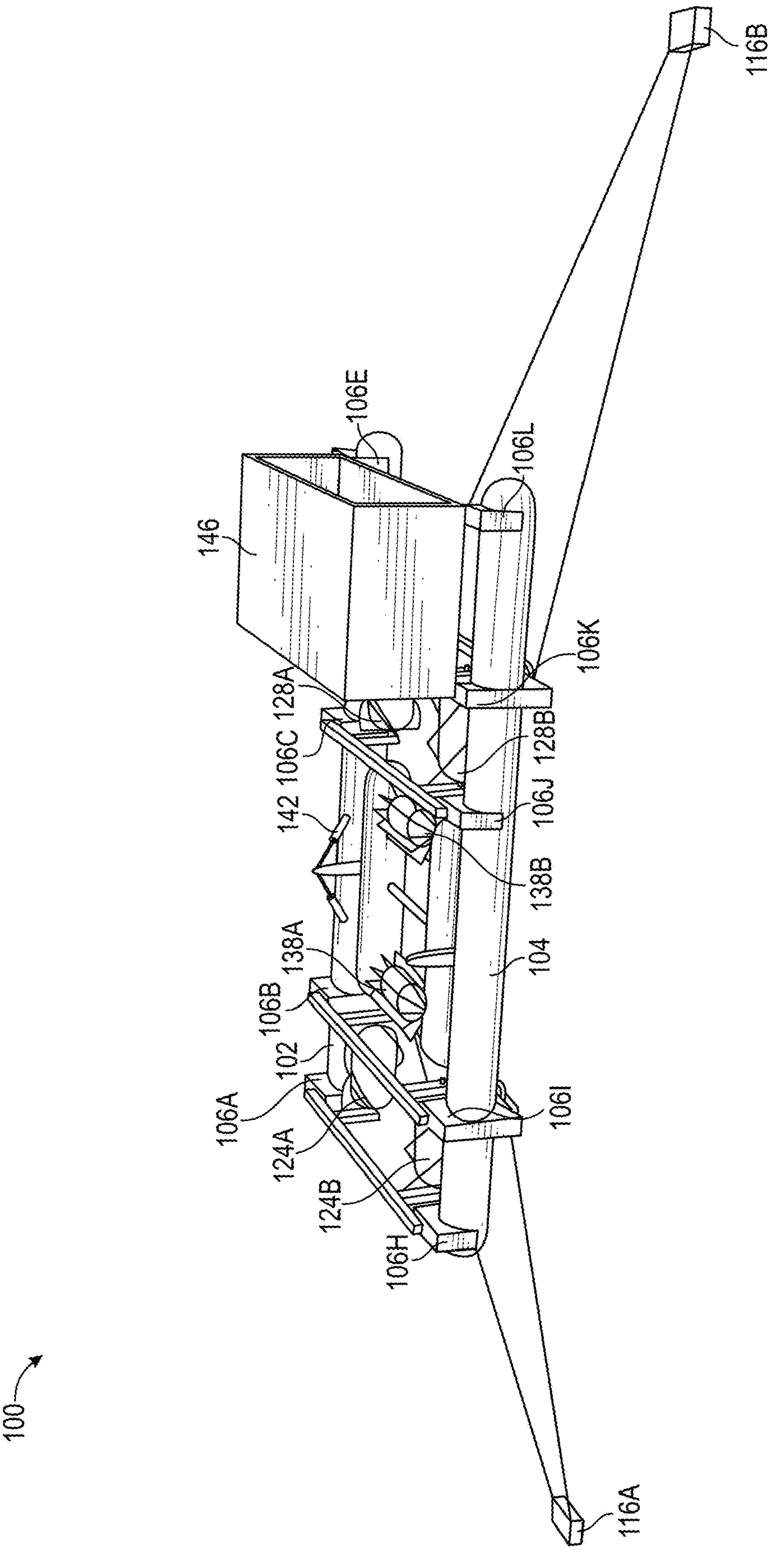
FIG. 1 illustrates a side perspective view of an ocean wave and tidal current energy conversion system.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a system that converts energy from ocean waves and currents to hydrogen in an efficient, inexpensive, and clean manner. The present invention seeks to solve these and other problems.

Energy production has become an important issue for many governments over the last few decades. A lot of conversation has been had over clean energy moving forward. As such, many have turned to solar or windmills to receive necessary power. However, this type of clean energy is often ineffective and does not produce the desired results. Another source of potential energy collection is found in the ocean. The ocean covers the majority of earth and is constantly moving in the form of waves and currents. This movement is produced by wind and tide from lunar cycles. With the constant movement of the ocean, there is a lot of potential energy that could be utilized.

Some have attempted to harness the power found in the ocean, but all too often these processes and systems are expensive, thereby preventing many companies and countries from pursuing such systems. Not only are these processes and systems expensive, but many of them have a large carbon footprint and are inefficient in producing energy. Components to form these systems can be difficult to find, making them expensive. Thus, these systems may have difficulty being mass produced and available to people around the world.

The ocean wave and tidal current energy conversion system described herein may comprise numerous vessels to store compressed hydrogen and numerous cylinders that convert energy from waves and currents into hydraulic pressure so as to drive electrical generators to create hydrogen. The system takes free energy, with no carbon footprint, to produce hydrogen. The system utilizes free energy from wind (waves) and tide. Every element of wave or current movement is captured by the system, with its arrangement of vessels and cylinders. This system uses opposing forces between pitch and roll, as well as rotary forces, that are combined to absorb wave and current energy and transfer that energy in hydraulic oil under pressure. Hydraulics drive generators, and electricity produces hydrogen and runs other equipment. In particular, in some embodiments, hydraulics drives electrical generators, which provide power to electrodes in a batch tank, and a compressor to fill all the vessels with compressed hydrogen. The produced hydrogen is compressed to least 250 PSI in all the vessels.

There are many advantages to this system: no carbon footprint; byproduct is oxygen, wave energy is from wind that can be hundreds of miles seaward of this system; tidal flow is a free benefit from the moon; this system off shore, when near shore, creates a breakwater to reduce wave erosion on the shore; demand for inexpensive systems is already in effect in parts of the world, such as Australia; the oceans shorelines are around every continent, meaning this system may be used anywhere; the system can be modular, allowing multiple systems to be coupled together; each system can vary in size; and water for hydrogen will never be depleted.

As shown in FIGS. 1-6, in one embodiment, an ocean wave and tidal current energy conversion system 100 (hereinafter referred to as the "energy conversion system") comprises a first vessel 102 (e.g., pressure tank) and a second vessel 104 (e.g., pressure tank), the first vessel 102 being parallel and spaced apart from the second vessel 104. The first and second vessels 102, 104 may be cylindrically shaped and sealed on each end of the vessels 102, 104 so as to have buoyancy and receive pressurized gases. In other embodiments, the first and second vessels 102, 104 may be rectangular or any other shape. In some embodiments, the first and second vessels may be conventional propane tanks, or other types of tanks. The first and second vessels 102, 104 may be a variety of lengths and circumferences to store pressurized gases, such as hydrogen.

The first vessel 102 may comprise a first frame member 106A, a second frame member 106B, a third frame member 106C, a fourth frame member 106D, and a fifth frame member 106E, each of these members 106A-106E may be positioned on and coupled to a first upper surface 108 of the first vessel 102. The first, second, third, fourth, and fifth frame members 106A-106E may be shaped to mirror the cylindrical first vessel 102 so as to be coupleable to the first vessel 102. The opposite side of the first, second, third, fourth, and fifth frame members 106A-106E may comprise a flat surface. The first vessel 102 may also comprise a sixth frame member 106F and a seventh frame member 106G, both of which may be positioned on and coupled to a first lower surface 110 of the first vessel 102. The sixth frame member 106F may also be coupled to the second frame member 106B. The seventh frame member 106G may be coupled to the fourth frame member 106D.

The second vessel 104 may comprise an eighth frame member 106H, a ninth frame member 106I, a tenth frame member 106J, an eleventh frame member 106K, and a twelfth frame member 106L, each of these members 106H-106L may be positioned on and coupled to a second upper surface 112 of the second vessel 104. The eighth, ninth, tenth, eleventh, and twelfth frame members 106H-106L may be shaped to mirror the cylindrical second vessel 104 so as to be coupleable to the second vessel 104. The opposite side of the eighth, ninth, tenth, eleventh, and twelfth frame members 106H-106L may comprise a flat surface. The second vessel 104 may also comprise a thirteenth frame member 106M and a fourteenth frame member 106N, both of which may be positioned on and coupled to a second lower surface 114 of the second vessel 104. The thirteenth frame member 106M may also be coupled to the ninth frame member 106I. The fourteenth frame member 106N may be coupled to the eleventh frame member 106K. It will be understood that while fourteen frame members are shown that any number of members may be used, whether more or less than fourteen. The frame members 106A-106N may be manufactured out of steel, aluminum, fiberglass, carbon fiber, or any other material used in the industry.

Further, the first and second vessels 102, 104 may be positioned with a first and a second anchor 116A, 116B attached to cables or chains so as to be facing the waves or current in the pitch position (shown in FIG. 1).

Figure 2:
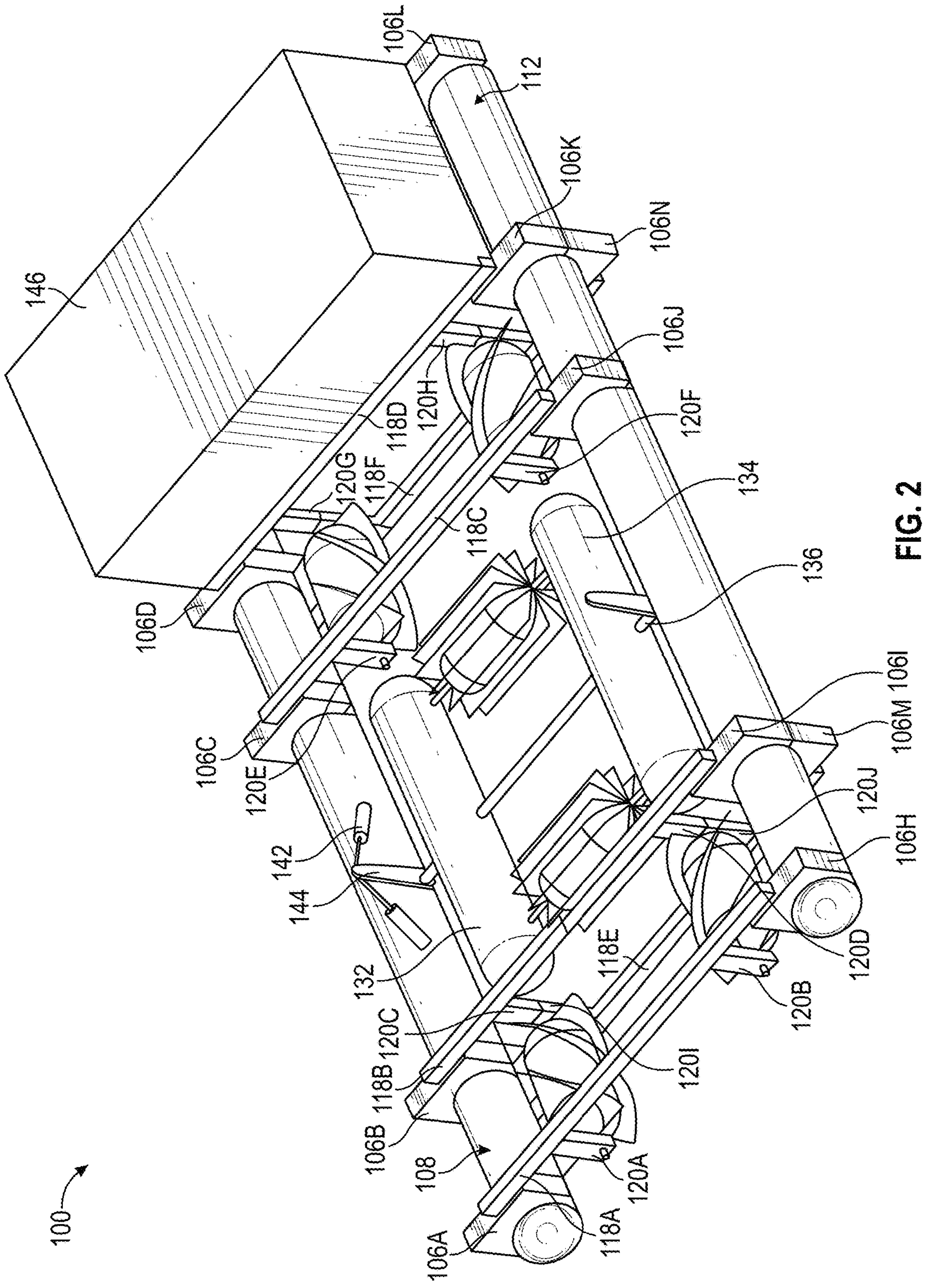
FIG. 2 illustrates a top, side perspective view of an ocean wave and tidal current energy conversion system.
Figure 3:
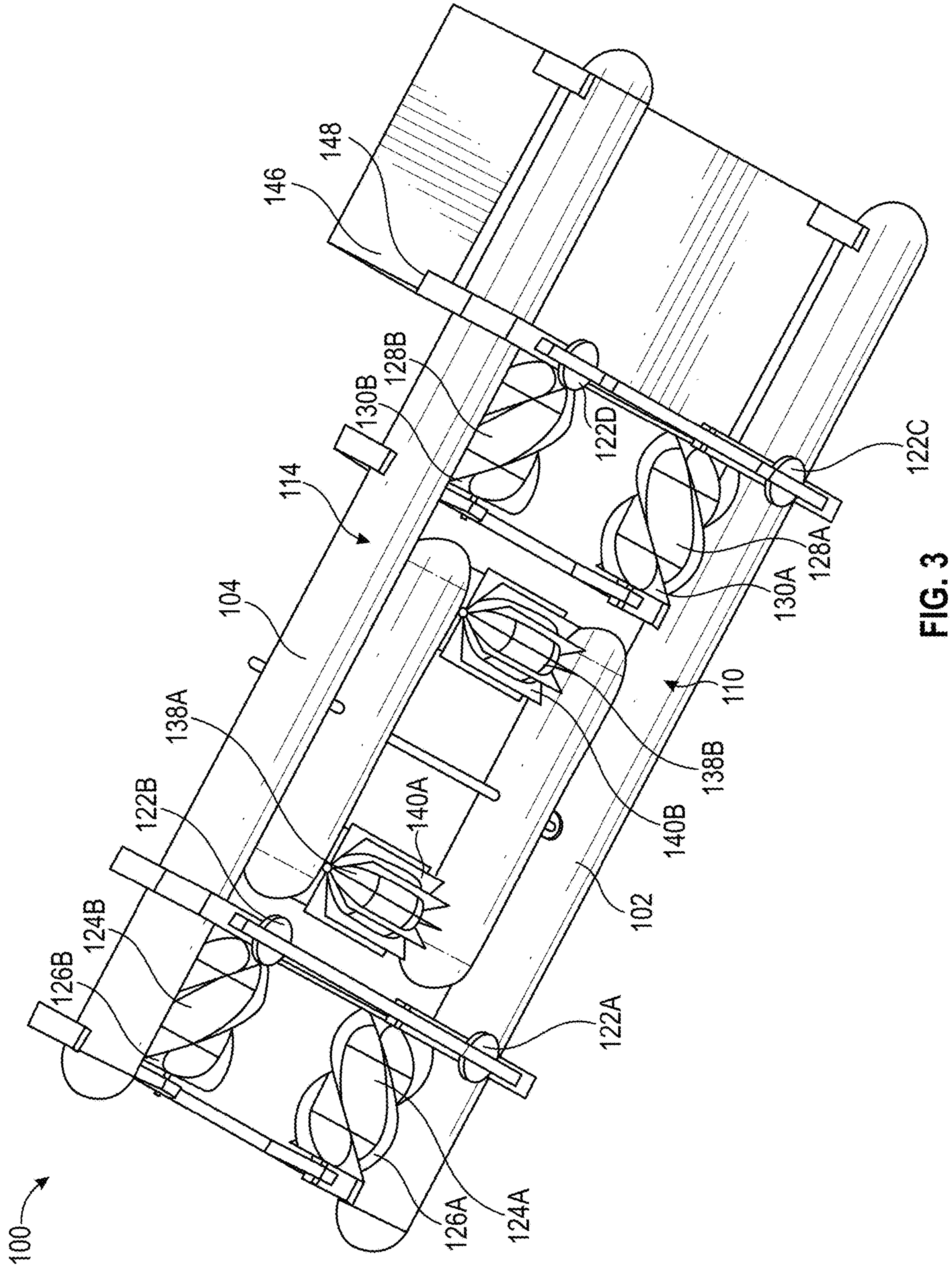
FIG. 3 illustrates a bottom perspective view of an ocean wave and tidal current energy conversion system.
Figure 4:
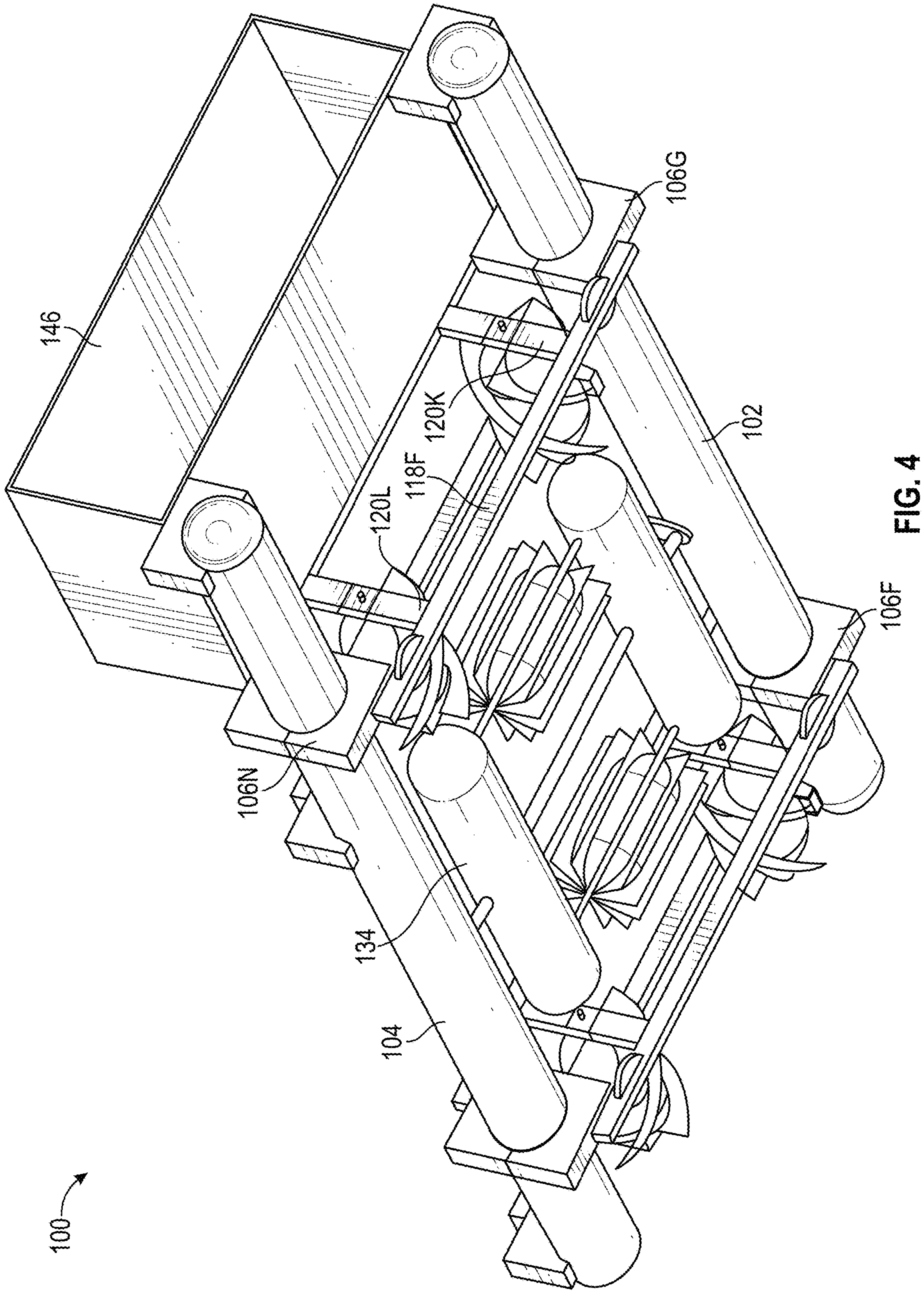
FIG. 4 illustrates a bottom, rear perspective view of an ocean wave and tidal current energy conversion system.

Referring to FIGS. 2-4, the frame members 106A-106N are positioned so as to receive supports that couple the first vessel 102 to the second vessel 104. In particular, a first support 118A with a first arm 120A and a second arm 120B may be interposed between the first and second vessels 102, 104 and coupled to the first and eighth frame members 106A, 106H. The first and second arms 120A, 120B may descend below the first support 118A. A second support 118B with a third arm 120C and a fourth arm 120D may be interposed between the first and second vessels 102, 104 and coupled to the second and ninth frame members 106B, 106I. The third and fourth arms 120C, 120D may descend below the second support 118B. A third support 118C with a fifth arm 120E and a sixth arm 120F may be interposed between the first and second vessels 102, 104 and coupled to the third and tenth frame members 106C, 106J. The fifth and sixth arms 120E, 120F may descend below the third support 118C. A fourth support 118D with a seventh arm 120G and an eighth arm 120H may be interposed between the first and second vessels 102, 104 and coupled to the fourth and eleventh frame members 106D, 106K. The seventh and eighth arms 120G, 120H may descend below the fourth support 118D. The first, second, third, and fourth supports 118A-118D may couple to the first upper surface 108 on the first vessel 102 and the second upper surface 112 on the second vessel 104. A fifth support 118E with a ninth arm 120I and tenth arm 120J may be interposed between the first and second vessels 102, 104 and coupled to the sixth and thirteenth frame members 106F, 106M. The fifth support 118E may comprise a first prop 122A and a second prop 122B, both of which may be configured to stabilize the energy conversion system when on solid ground. The first and second props 122A, 122B may be disc shaped or any other shape. The ninth and tenth arms 120I, 120J may extend upward and couple to the third and fourth arms 120C, 120D on the second support 118B. A sixth support 118F with an eleventh arm 120K and twelfth arm 120L may be interposed between the first and second vessels 102, 104 and coupled to the seventh and fourteenth frame members 106G, 106N. The sixth support 118F may comprise a third prop and a fourth prop 122C, 122D, both of which may be configured to stabilize the energy conversion system when on solid ground. The third and fourth props 122C, 122D may be disc shaped or any other shape. The eleventh and twelfth arms 120K, 120L may extend upward and couple to the seventh and eighth arms 120G, 120H on the fourth support 118D. While six supports are shown, it will be appreciated that more or less than six supports may be used.

Interposed between and perpendicular to the first and second supports 102, 104 may be a first cylinder 124A and a second cylinder 124B. The first cylinder 124A may be rotatably coupled to the first arm 120A on the first support 118A and the third arm 120C on the second support 118B and the ninth arm 120I on the fifth support 118E. The first cylinder 124A may comprise a plurality of first fins 126A which may be cork screw fins that wrap around the first cylinder 124A. The second cylinder 124B may be rotatably coupled to the second arm 120B on the first support 102 and the fourth arm 120D on the second support 102 and the tenth arm 120J on the fifth support 118E. The second cylinder 124B may comprise a plurality of second fins 126B which may be cork screw fins that wrap around the second cylinder 124B. The first and second cylinders 124A, 124B may be coupled to and interact with one or more hydraulic systems.

Interposed between and perpendicular to the third and fourth supports 118C, 118D may be a third cylinder 128A and a fourth cylinder 128B. The third cylinder 128A may be rotatably coupled to the fifth arm 120E on the third support 118C and the seventh arm 120G on the fourth support 118D and the eleventh arm 120K on the sixth support 118F. The third cylinder 128A may comprise a plurality of third fins 130A which may be cork screw fins that wrap around the third cylinder 128A. The fourth cylinder 128B may be rotatably coupled to the sixth arm 120F on the third support 118C and the eighth arm 120H on the fourth support 118D and the twelfth arm 120L on the sixth support 118F. The fourth cylinder 128B may comprise a plurality of fourth fins 130B which may be cork screw fins that wrap around the fourth cylinder 128B. The third and fourth cylinders 128A, 128B may be coupled to and interact with one or more hydraulic systems. The first, second, third, and fourth cylinders 124A, 124B, 128A, 128B may rotate with the ocean current and wave movement on axles parallel to the first and second vessels 102, 104. The first, second, third, and fourth cylinders 124A, 124B, 128A, 128B may be configured to drive rotary hydraulic pumps and contribute to the overall hydraulic energy. The vessels 102, 104 and cylinders 124A, 124B, 128A, 128B may be on the same plane.

Figure 5:
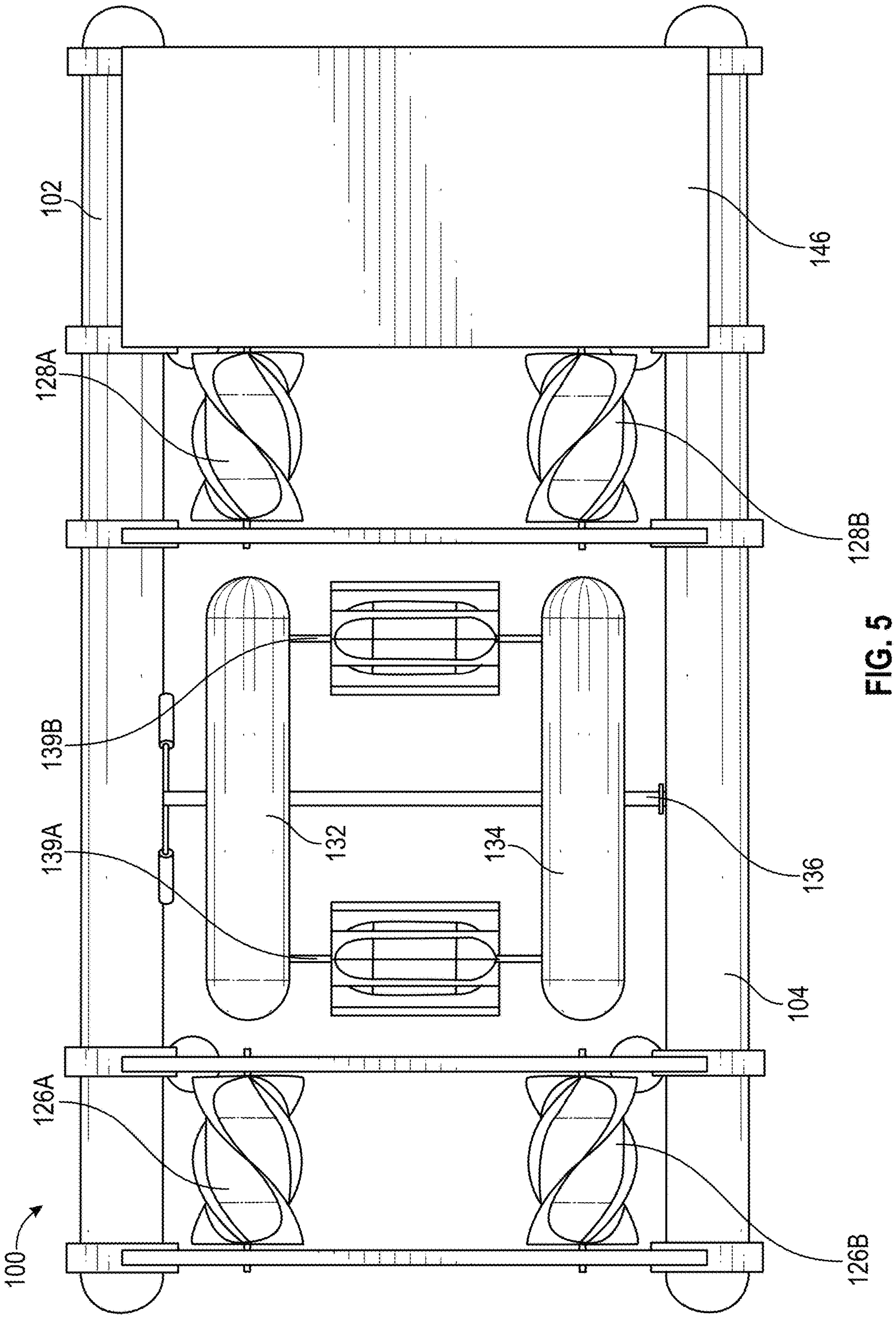
FIG. 5 illustrates a top plan view of an ocean wave and tidal current energy conversion system.
Figure 6:
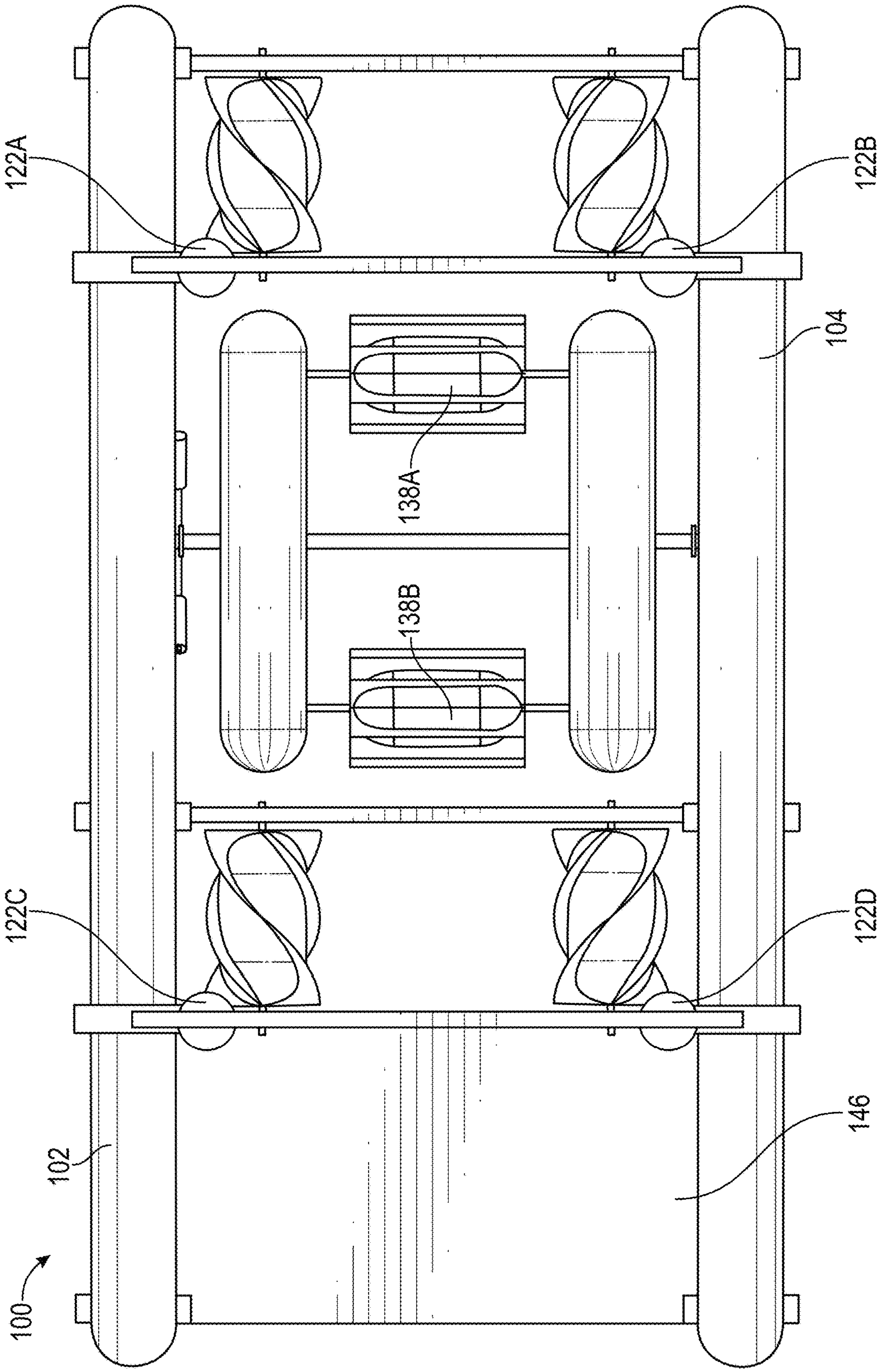
FIG. 6 illustrates a bottom plan view of an ocean wave and tidal current energy conversion system.

Further, the energy conversion system 100 may comprise a third vessel 132 and a fourth vessel 134, both of which may be shorter than the first and second vessels 102, 104. The third and fourth vessels 132, 134 may be positioned between the first and second vessels 102, 104, being parallel thereto. The third and fourth vessels 132, 134 may also be positioned between the second support and the third supports 118B, 118C. However, it could be envisioned that the third and fourth vessels 132, 134 may be positioned between other supports. The third and fourth vessels 132, 134 may be rotatably coupled to the first and second vessels 102, 104 via an axle 136. Positioned between the third and fourth vessels 132, 134 may be a fifth cylinder 138A and a sixth cylinder 138B. The fifth and sixth cylinders 138A, 138B may be rotatably coupled to the third and fourth vessels 132, 134 via second axles 139A, 139B (FIG. 5). The fifth cylinder 138A may comprise a plurality of fifth fins 140A. The sixth cylinder 138B may comprise a plurality of sixth fins 140B. The fifth and sixth cylinders 138A, 138B may be coupled to and interact with one or more hydraulic systems. The third and fourth vessels 132, 134 may have a teeter totter effect on the axle 136 due to swells on the ocean. The third and fourth vessels 132, 134 are spread apart to maximize the roll effect from average wave action. This will allow the axle 136 to rotate back and forth, which allows relative motion energy to be transferred by a bell crank on the axle 136 that creates hydraulic oil pressure via hydraulic cylinders 142 (FIG. 1), being actuated by the bell crank to a mount 144 (FIG. 1) on the first and/or second vessels 102, 104. In addition, due to the fins on the fifth and sixth cylinders 138A, 138B, the fifth and sixth cylinders 138A, 138B can rotate, which creates rotational energy that may be configured to operate a rotary hydraulic pump that would also contribute hydraulic oil flow and pressure.

The energy conversion system 100 may also comprise a housing 146 that comprises a recessed edge 148 that rests on and is secured to the fourth support 118D. An edge opposite the recessed edge may rest on and be secured to fifth and twelfth frame members 106E, 106L. The housing 146 may receive mechanical and electrical components. The housing, vessels, frame members, cylinders, supports, and any other components may have high solids epoxy primer, urethane topcoats, marine bottom paints, sacrificial zinc anodes, or some combination thereof, which will help prevent most marine growth.

Figure 7:
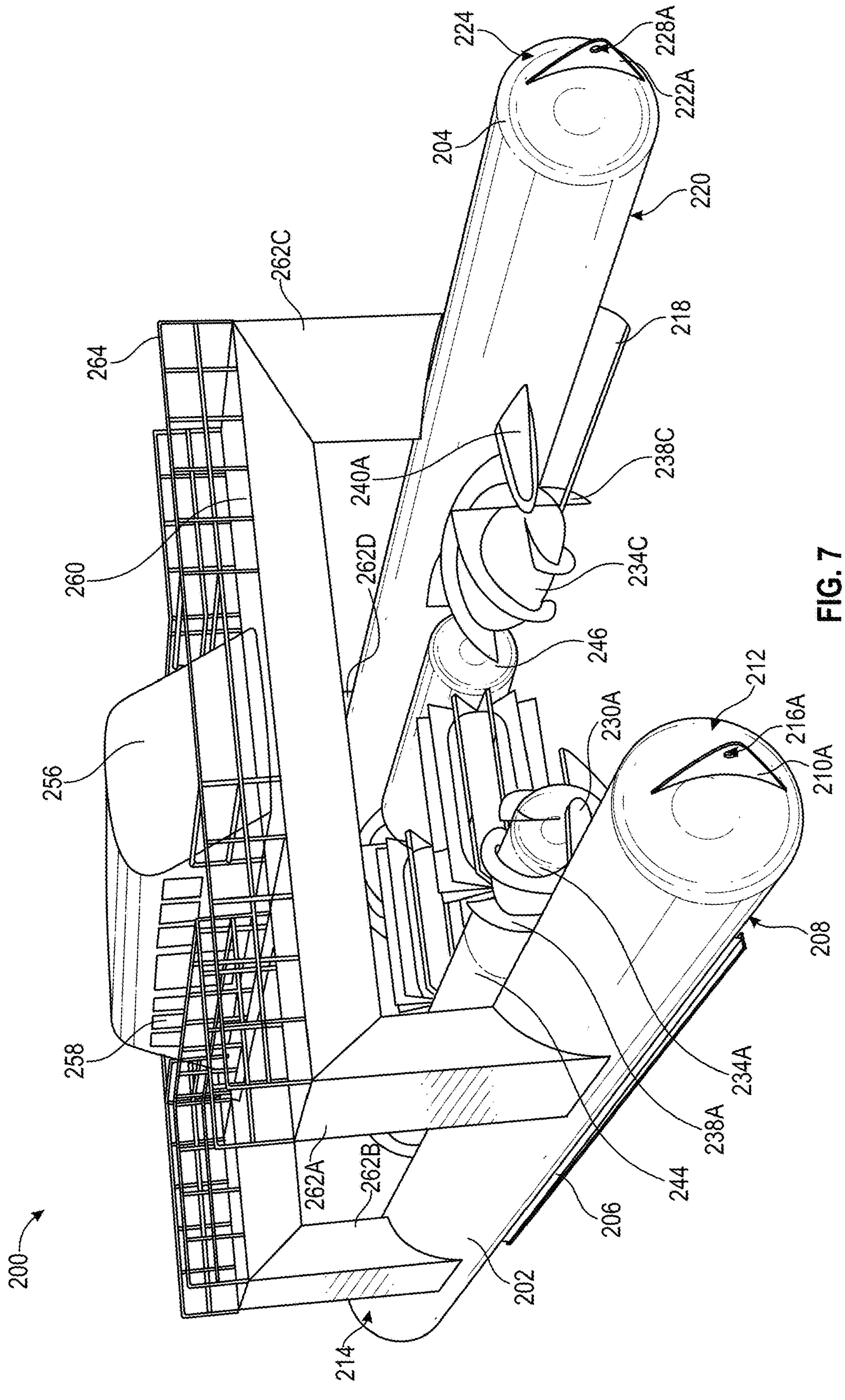
FIG. 7 illustrates a front perspective view of an ocean wave and tidal current energy conversion system.
Figure 8:
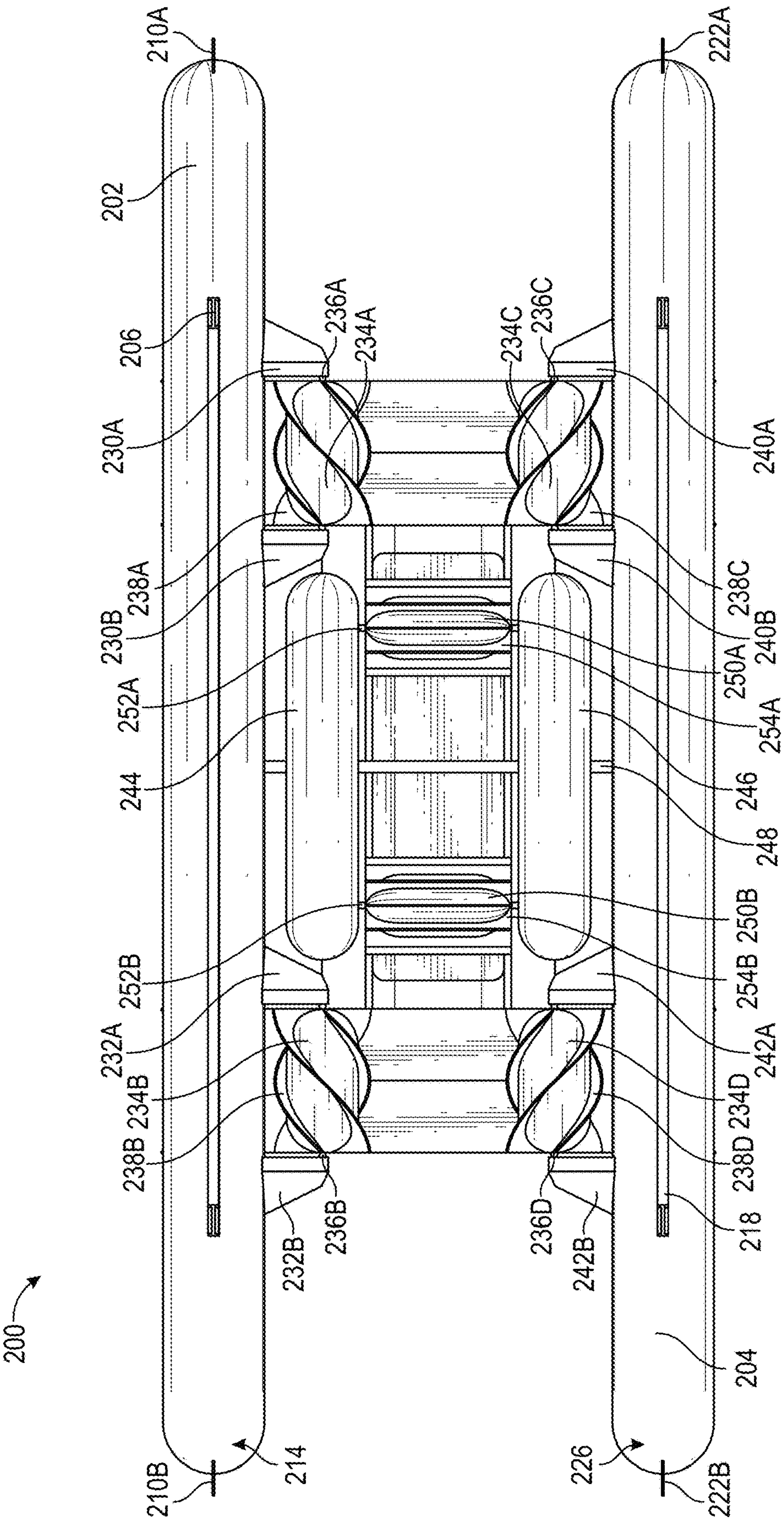
FIG. 8 illustrates a bottom plan view of an ocean wave and tidal current energy conversion system.
Figure 9:
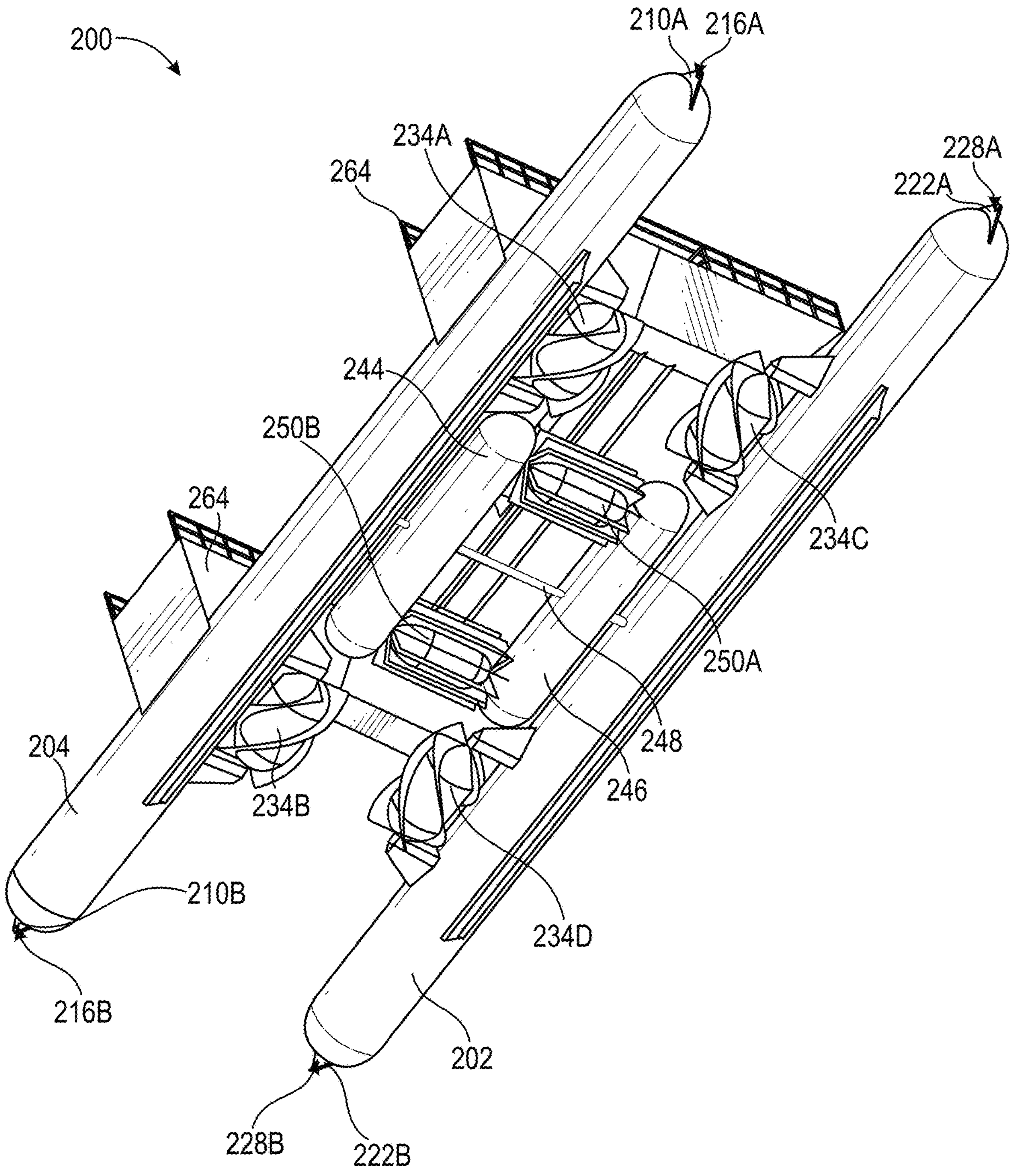
FIG. 9 illustrates a bottom perspective view of an ocean wave and tidal current energy conversion system.

As shown in FIGS. 7-9, in one embodiment, an energy conversion system 200 comprises a first vessel 202 (e.g., pressure tank) and a second vessel 204 (e.g., pressure tank), the first vessel 202 being parallel and spaced apart from the second vessel 204. The first and second vessels 202, 204 may be cylindrically shaped and sealed on each end of the vessels 202, 204 so as to have buoyancy and receive pressurized gases. In other embodiments, the first and second vessels 202, 204 may be rectangular or any other shape. In some embodiments, the first and second vessels 202, 204 may be conventional propane tanks, or other types of tanks. The first and second vessels 202, 204 may be a variety of lengths and circumferences to store pressurized gases, such as hydrogen.

The first vessel 202 may comprise a first vessel fin 206 fastened on a first lower surface 208. The first vessel fin 206 may be fastened to the first lower surface 208 via welding or other fastening mechanisms. The first vessel fin 206 may extend downward away from the first vessel 202. The first vessel 202 may also comprise a first member 210A and a second member 210B coupled to a first end 212 and a second end 214, respectively. The first member 210A may comprise a first aperture 216A and the second member 210B may comprise a second aperture 216B. The first and second members 210A, 210B may be generally triangular shaped; however, other shapes may be used such as circular or rectangular members. The first and second members 210A, 210B may also be flat, or in some embodiments, include more of a three-dimensional configuration.

Similarly, the second vessel 204 may comprise a second vessel fin 218 fastened on a second lower surface 220. The second vessel fin 218 may be fastened to the second lower surface 220 via welding or other fastening mechanisms. The second vessel fin 218 may extend downward away from the second vessel 204. The second vessel 204 may also comprise a third member 222A and a fourth member 222B coupled to a third end 224 and a fourth end 226, respectively. The third member 222A may comprise a third aperture 228A and the fourth member 222B may comprise a fourth aperture 228B. The third and fourth members 222A, 222B may be generally triangular shaped; however, other shapes may be used such as circular or rectangular members. The third and fourth members 222A, 222B may also be flat, or in some embodiments, include more of a three-dimensional configuration. It will be understood that the first and second vessel fins 206, 218 provide stability to the energy conversion system 200. The first, second, third, and fourth members 210A, 210B, 222A, 222B allow the anchoring systems (e.g., metal cables and attachments) to be attached thereto so as to secure the energy conversion system 200 in place. As such, the first and second vessels 202, 204 may be positioned with a one or more anchors so as to be facing the waves or current in the pitch position (similar to those shown in FIG. 1).

The first vessel 202 may comprise a first support 230A and a second support 230B and a third support 232A and a fourth support 232B. The first and second supports 230A, 230B protrude from an inner side of the first vessel 202. Interposed between the first and second supports 230A, 230B may be a first cylinder 234A that may be sealed. The first cylinder 234A may be rotatably coupled to the first and second supports 230A, 230B via a first axle 236A. The first cylinder 234A may comprise a plurality of first fins 238A which, in some embodiments, may be cork screw fins that wrap around the first cylinder 234A.

The third support 232A and the fourth support 232B also protrude from the inner side of the first vessel 202. Interposed between the third and fourth supports 232A, 232B may be a second cylinder 234B that may be sealed. The second cylinder 234B may be rotatably coupled to the third and fourth supports 232A, 232B via a second axle 236B. The second cylinder 234B may comprise a plurality of second fins 238B which, in some embodiments, may be cork screw fins that wrap around the second cylinder 234B.

The second vessel 204 may comprise a fifth support 240A and a sixth support 240B and a seventh support 242A and an eighth support 242B. The fifth and sixth supports 240A, 240B protrude from an inner side of the second vessel 204. Interposed between the fifth and sixth supports 240A, 240B may be a third cylinder 234C that may be sealed. The third cylinder 234C may be rotatably coupled to the fifth and sixth supports 240A, 240B via a third axle 236C. The third cylinder 234C may comprise a plurality of third fins 238C which, in some embodiments, may be cork screw fins that wrap around the third cylinder 234C.

The seventh support 242A and the eighth support 242B also protrude from the inner side of the second vessel 204. Interposed between the seventh and eighth supports 242A, 242B may be a fourth cylinder 234D that may be sealed. The fourth cylinder 234D may be rotatably coupled to the seventh and eighth supports 242A, 242B via a fourth axle 236D. The fourth cylinder 234D may comprise a plurality of fourth fins 238D which, in some embodiments, may be corkscrew-shaped fins that wrap around the fourth cylinder 234D.

The first, second, third, and fourth cylinders 234A, 234B, 234C, 234D may rotate with the ocean current and wave movement on axles parallel to the first and second vessels 202, 204. The first, second, third, and fourth cylinders 234A, 234B, 234C, 234D may be configured to drive rotary hydraulic pumps and contribute to the overall hydraulic energy. The vessels 202, 204 and cylinders 234A, 234B, 234C, 234D may be on the same plane.

Further, the energy conversion system 200 may comprise a third vessel 244 and a fourth vessel 246, both of which may be shorter than the first and second vessels 202, 204. The third and fourth vessels 244, 246 may be positioned between the first and second vessels 202, 204, being parallel thereto. The third and fourth vessels 244, 246 may also be positioned between the first and second cylinders 234A, 234B and the third and fourth cylinders 234C, 234D. However, it could be envisioned that the third and fourth vessels 244, 246 may be positioned between other components of the energy conversion system 200. The third and fourth vessels 244, 246 may be rotatably coupled to the first and second vessels 202, 204 via an axle 248. Positioned between the third and fourth vessels 244, 246 may be a fifth cylinder 250A at one end and a sixth cylinder 250B and an end opposite the fifth cylinder 250A. The fifth and sixth cylinders 250A, 250B may be rotatably coupled to the third and fourth vessels 244, 246 via vessel axles 252A, 252B (FIG. 8). The fifth cylinder 250A may comprise a plurality of fifth fins 254A. The sixth cylinder 250B may comprise a plurality of sixth fins 254B. The plurality of fifth and six fins 254A, 254B may be generally rectangular-shaped fins and run lengthwise on the fifth and sixth cylinders 250A, 250B. The fifth and sixth cylinders 250A, 250B may be coupled to and interact with one or more hydraulic systems. The third and fourth vessels 244, 246 may have a teeter totter effect on the axle 248 due to swells on the ocean. The third and fourth vessels 244, 246 are spread apart to maximize the roll effect from average wave action. This will allow the axle 248 to rotate back and forth, which allows relative motion energy to be transferred by a bell crank on the axle 248 that creates hydraulic oil pressure via hydraulic cylinders (similar to those shown in FIG. 1), being actuated by the bell crank to a mount on the first and/or second vessels. In addition, due to the fins on the fifth and sixth cylinders 250A, 250B, the fifth and sixth cylinders 250A, 250B can rotate, which creates rotational energy that may be configured to operate a rotary hydraulic pump that would also contribute hydraulic oil flow and pressure.

The energy conversion system 200 may also comprise a cabin 256 that may include one or more windows 258 that rests on a platform 260. The platform 260 may comprise a first leg 262A, a second leg 262B, a third leg 262C, and a fourth leg 262D. The first leg and second leg 262A, 262B may be coupled to the first vessel 202. The third leg and fourth leg 262C, 262D may be coupled to the second vessel 204. The platform 260 may extend between the first and second vessels 202, 204. Further, an upper surface of the platform 260 may comprise guardrails 264. The cabin 256 may include mechanical and electrical components, sleeping quarters, etc. The housing, vessels, frame members, cylinders, supports, and any other components may have high solids epoxy primer, urethane topcoats, marine bottom paints, sacrificial zinc anodes, or some combination thereof, which will help prevent most marine growth. It will be appreciated that the energy conversion system 200 may be coupled to other energy conversion systems to create a breakwater (shown in FIG. 10).

Figure 11:
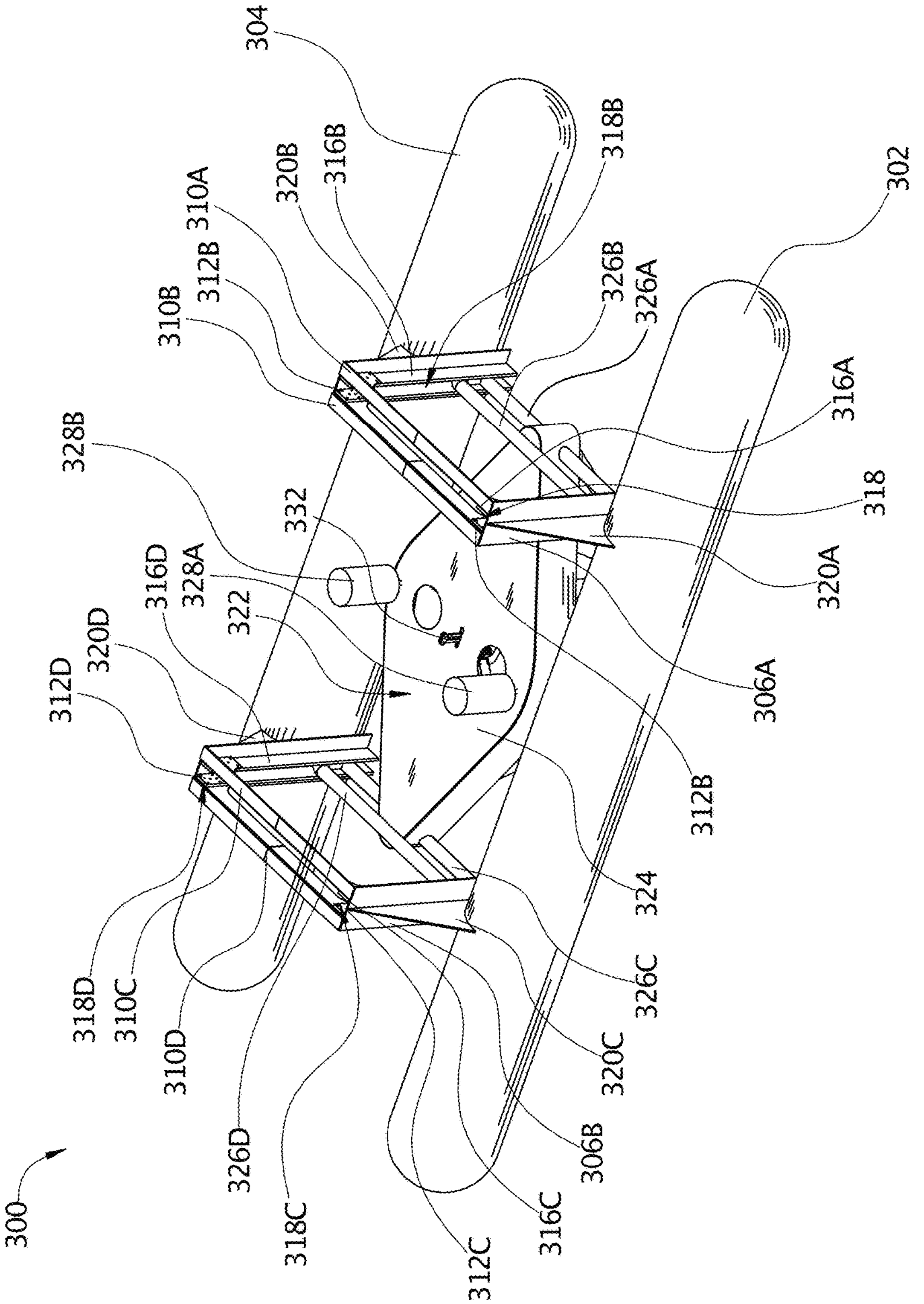
FIG. 11 illustrates a top, side perspective view of an ocean wave and tidal current energy conversion system.
Figure 12:
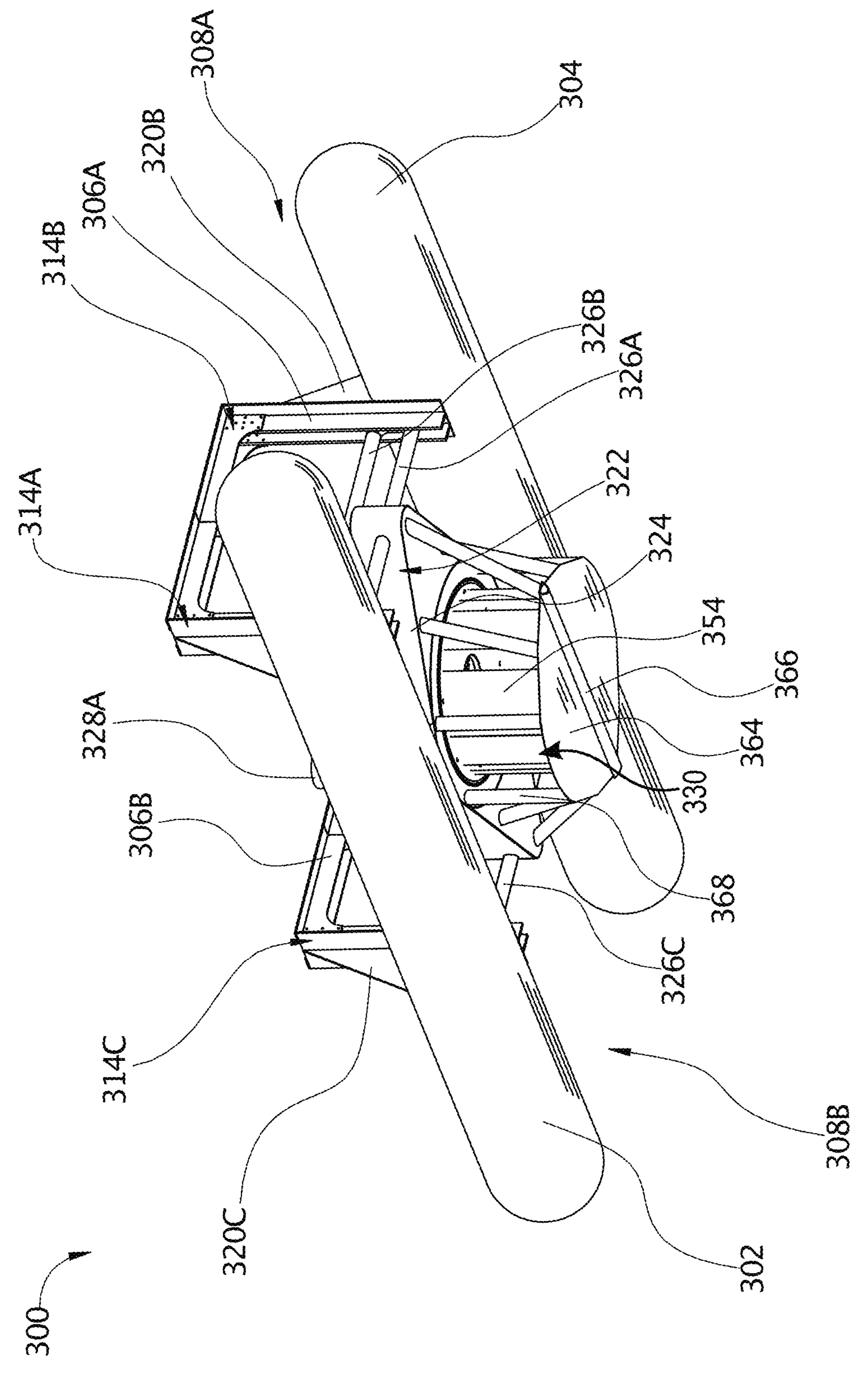
FIG. 12 illustrates a side, bottom perspective view of an ocean wave and tidal current energy conversion system.
Figure 13:
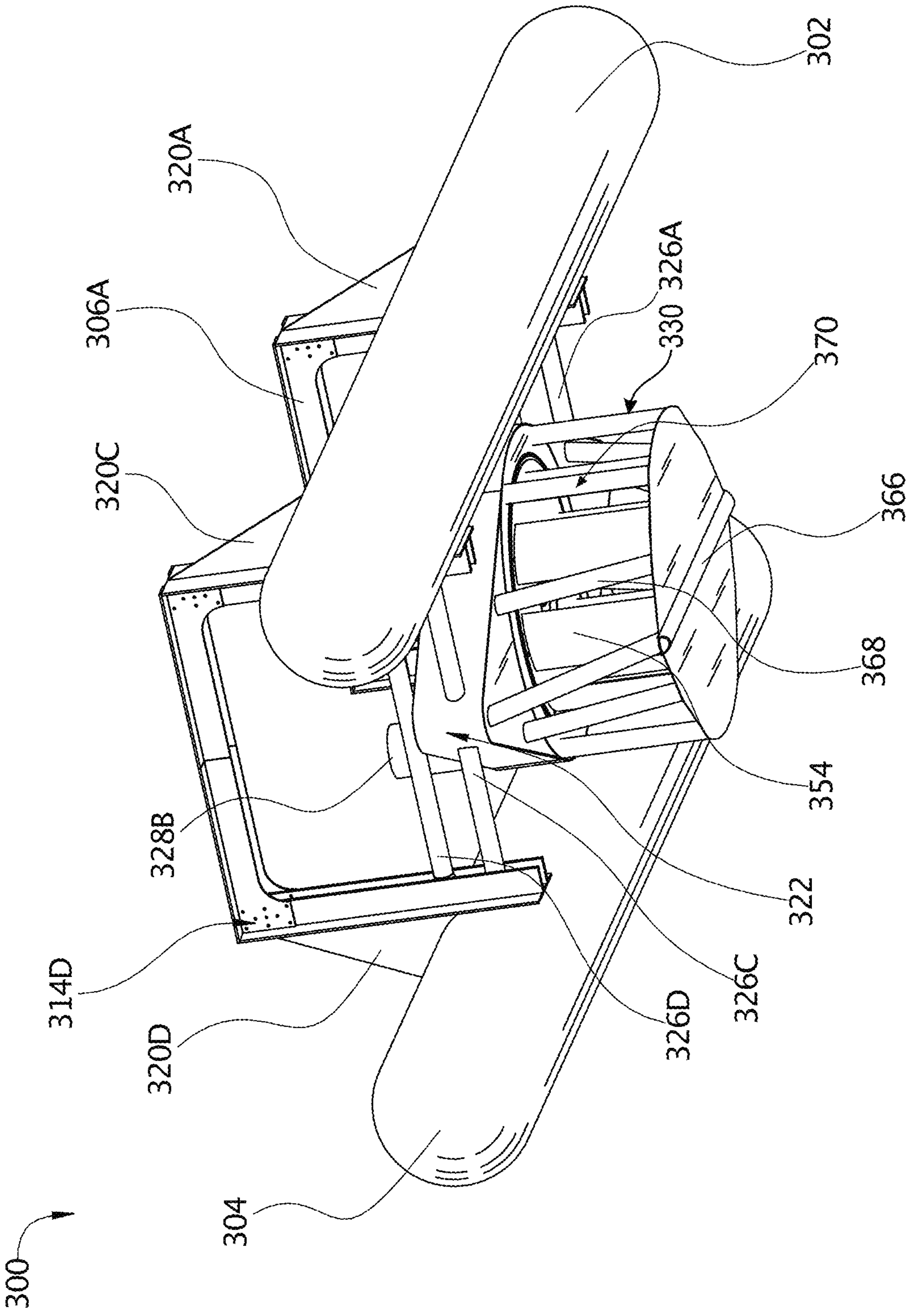
FIG. 13 illustrates a rear, bottom perspective view of an ocean wave and tidal current energy conversion system.

In one embodiment, as illustrated in FIGS. 11-13, an energy conversion system 300 comprises a first vessel 302 (e.g., pressure tank) and a second vessel 304 (e.g., pressure tank), the first vessel 302 being parallel and spaced apart from the second vessel 304. The first and second vessels 302, 304 may be cylindrically shaped and sealed on each end of the vessels 302, 304 so as to have buoyancy and receive pressurized gases. In other embodiments, the first and second vessels 302, 304 may be rectangular or any other shape. In some embodiments, the first and second vessels 302, 304 may be conventional propane tanks, or other types of tanks.

The first and second vessels 302, 304 may be a variety of lengths and circumferences to store pressurized gases, such as hydrogen.

A first support 306A may be positioned at a first end 308A of the first and second vessels 302, 304. The first support 306A may include a first frame 310A and a second frame 310B. The first and second frames 310A, 310B may be coupled together with one or more first brackets 312A, 312B. In some embodiments, the first and second frames 310A, 310B may be coupled together via welding or any other fastening mechanism. The one or more first brackets 312A, 312B may interact with and be positioned on an inner surface of the first support 306A at a first upper side 314A (FIG. 12) and a second upper side 314B (FIG. 12). The one or more first brackets 312A, 312B may also interact with a first channel member 316A and a second channel member 316B, both of which are coupled to the first support 306A. The first and second channel members 316A, 316B may be u-shaped so as to create a first channel 318A in the first channel member 316A and a second channel 318B in the second channel member 316B. The first support 306A may have a first vessel support 320A on one side and a second vessel support 320B on a side opposite the first vessel support 320A. The first vessel support 320A may rest upon and be coupled to an upper surface of the first vessel 302. The second vessel support 320B may rest upon and be coupled to an upper surface of the second vessel 304. The first support 306A may be perpendicular to and interposed between the first and second vessels 302, 304.

A second support 306B may be positioned at a second end 308B of the first and second vessels 302, 304. The second support 306B may include a third frame 310C and a fourth frame 310B. The third and fourth frames 310C, 310D may be coupled together with one or more second brackets 312C, 312D. In some embodiments, the third and fourth frames 310C, 310D may be coupled together via welding or any other fastening mechanism. The one or more second brackets 312C, 312D may interact with and be positioned on an inner surface of the second support 306B at a third upper side 314C and a fourth upper side 314D. The one or more second brackets 312A, 312B may also interact with a third channel member 316C and a fourth channel member 316D, both of which are coupled to the second support 306B. The third and fourth channel members 316C, 316D may be u-shaped so as to create a third channel 318C in the third channel member 316C and a fourth channel 318D in the fourth channel member 316D. The second support 306B may have a third vessel support 320C on one side and a fourth vessel support 320D on a side opposite the third vessel support 320C. The third vessel support 320C may rest upon and be coupled to an upper surface of the first vessel 302. The fourth vessel support 320D may rest upon and be coupled to an upper surface of the second vessel 304. The second support 306B may be perpendicular to and interposed between the first and second vessels 302, 304.

Positioned between and coupled to the first and second supports 306A, 306B is a turbine 322 (e.g., a vertical axis turbine). The turbine 322 may comprise a housing 324 that may be coupled to a first rod 326A and interacts with a second rod 326B at one end of the housing 324. The first rod 326A and second rod 326B may be positioned in the first and second channels 318A, 318B, being adjustably secured to the first and second channel members 316A, 316B. That is, the first and second rods 326A, 326B may be adjusted in height along the first and second channels 318A, 318B, thereby allowing the turbine 322 to move. The first rod 326A may pass through the housing 324 while the second rod 326B rests upon an upper surface of the housing 324. Further, the housing 324 may be coupled to a third rod 326C and interact with a fourth rod 326D at an end of the housing 324 opposite insertion of the first rod 326A. The third rod 326C and fourth rod 326D may be positioned in the third and fourth channels 318C, 318D, being adjustably secured to the third and fourth channel members 316C, 316D. That is, the third and fourth rods 326C, 326D may be adjusted in height along third and fourth channels 318C, 318D, thereby allowing the turbine 322 to move. The third rod 326C may pass through the housing 324 while the fourth rod 326C rests upon an upper surface of the housing 324. It will be appreciated that the turbine 322 may be moved up and down via cables and winches or by any other mechanisms. Referring to FIG. 11, the upper surface of the housing 324 may comprise a first cylinder 328A (e.g., generators or hydraulic pumps) and a second cylinder 328B (e.g., generators or hydraulic pumps). While two cylinders are shown, it will be appreciated that any number of cylinders may be used, such as one or three.

Figure 14:
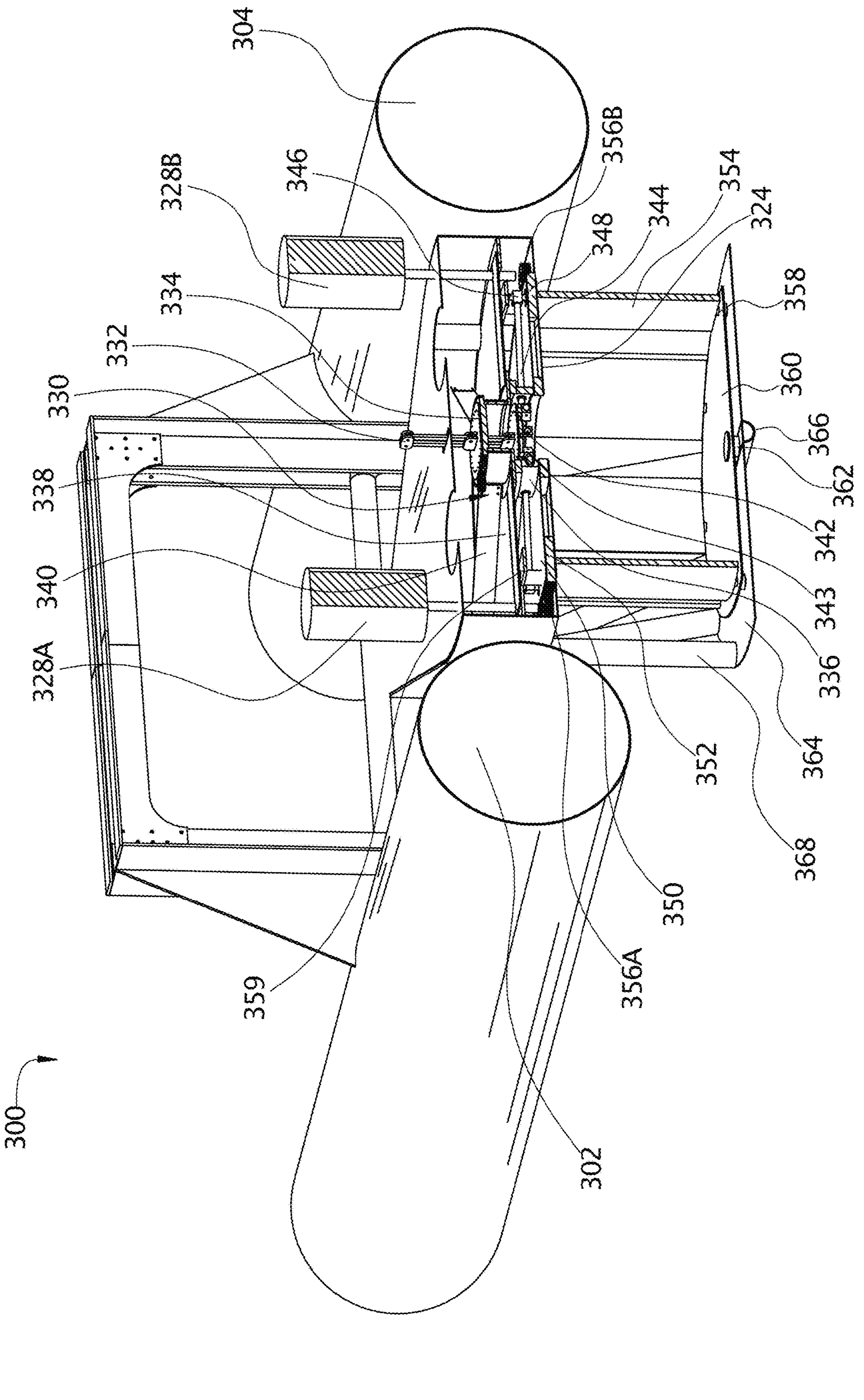
FIG. 14 illustrates a cross-sectional view of a turbine of an ocean wave and tidal current energy conversion system.

As shown in FIGS. 12-16, the housing 324 may include a rotating portion 330 of the housing 324. The rotating portion 330 is capable of rotating 360 degrees. Referring to FIG. 14, the rotating portion 330 may comprise a bearing and a controller 332, such as a cyclic controller. The controller 332 may pass through the top of the housing 324 and through a second housing 334. The second housing 334, on an outer edge, may have gear teeth to interact with a gear to promote rotation. Positioned below and coupled to a lower surface of the second housing 334, may be a third housing 336. A first plate 338 may rest on an upper surface of the third housing 336 and extend to an inner wall of the housing 324. On an upper surface of the first plate 338, support wings 340 may extend from an outer surface of the second housing 334 to the inner surface of the housing 324. The third housing 336 may be open to, or is accessible through, the bottom of the second housing 334. As such, the controller 332 may descend through the second housing 334 and into the third housing 336, where the controller 332 couples to a second plate 342 (e.g., a swashplate). The second plate 342 can be adjusted in rotation to adapt to the inflow direction as well as move in all directions by means of the controller 332 to control the rotational speed and torque. The second plate 342 may be configured to interact with and be secured to first rods 344 on a lower surface of the second plate 342 via first fasteners 343 that protrude through the third housing 336 to second fasteners 346, where one or more second rods 348 may also couple to the second fasteners 346. The one or more second rods 348 may be perpendicular to the first rods 344 and pass through a third plate 350, a fourth plate 352, and the housing 324 to blades 354 (e.g., vertical airfoil shaped blades), the blades 354 being located underneath the housing. The blades 354 are on a rotating vertical axis where the pitch of each blade 354 is controlled by the controller 332. The controller 332 adjusts each blade 354 for the maximum take-off power of the passing ocean or river current. In some embodiments, there may be two or more blades. The fourth plate 352 may comprise gear teeth that interact with a first gear 356A and a second gear 356B, which are configured to rotate the rotating portion 330. The blades 354 may couple to axles 358 (e.g., pivot axles). The pivot axles 358, at an upper end, may couple to a ring 359 that is interposed between the first plate 338 and third plate 350. In addition, the pivot axles 358 may pass through the length of the blades 354 and couple to a fifth plate 360. The fifth plate 360 may comprise a turbine axle 362 that couples to a bottom plate 364. The bottom plate 364 may include a fin 366 on its lower surface. The bottom plate 364 may be coupled to a lower surface of the housing 324 via a plurality of support arms 368, thereby creating a cage 370 (e.g., FIG. 13) to protect the blades 354. The cage 370 and housing 324 may each be V-shaped at both ends so as, in some embodiments, to act as an ice breaker bow to deal with break-up ice moving in and out of an inlet.

It will be appreciated that there may be two centers of rotation. In the first center of rotation, each blade 354 has the pivot axle 358 which follows a fixed circular path. In the second center of rotation, the rotating portion 330 varies in rotation depending on the position of the cyclic control 332, and the first rods 344 extend from the second plate 342 (e.g., cyclic swashplate) to a position on each blade 354 proximate the pivot axle 358. In addition, in some embodiments, the second plate 342, which controls the blade pitch, may be a shape other than circular. For example, the second plate 342 may be shaped to minimize drag of an advancing blade, then quickly change pitch so the retreating blade captures the greatest force from the direction of the water flow.

Figure 15:
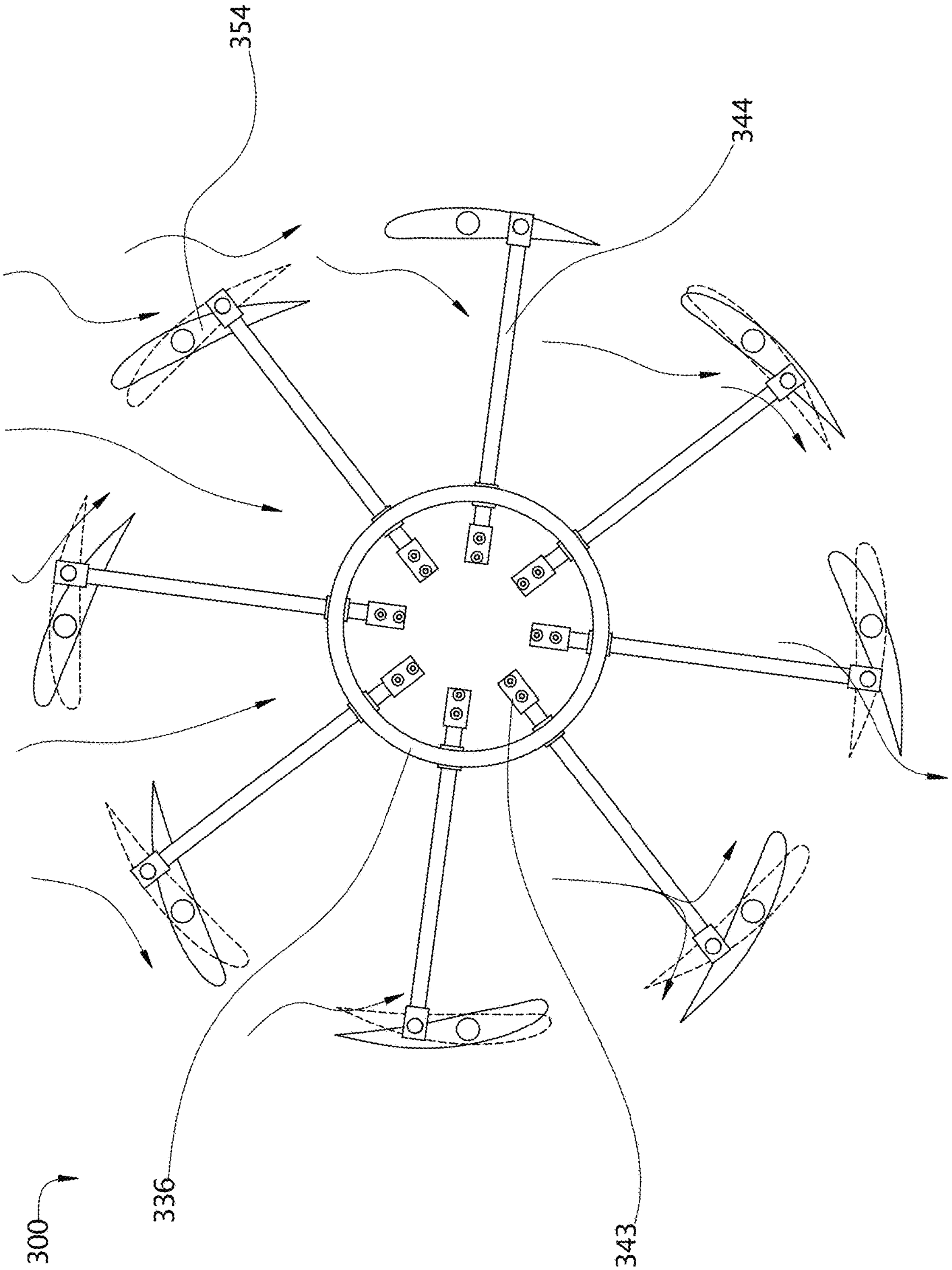
FIG. 15 illustrates a top plan view of a turbine of an ocean wave and tidal current energy conversion system.

Referring to FIG. 15, the blades 354 may adjust to water current via both the pivot axles 358 and the first and second rods 344, 348, which are controlled by the controller 332. Due to these adjustments, the system 300 is capable of capturing maximum energy.

Figure 16:
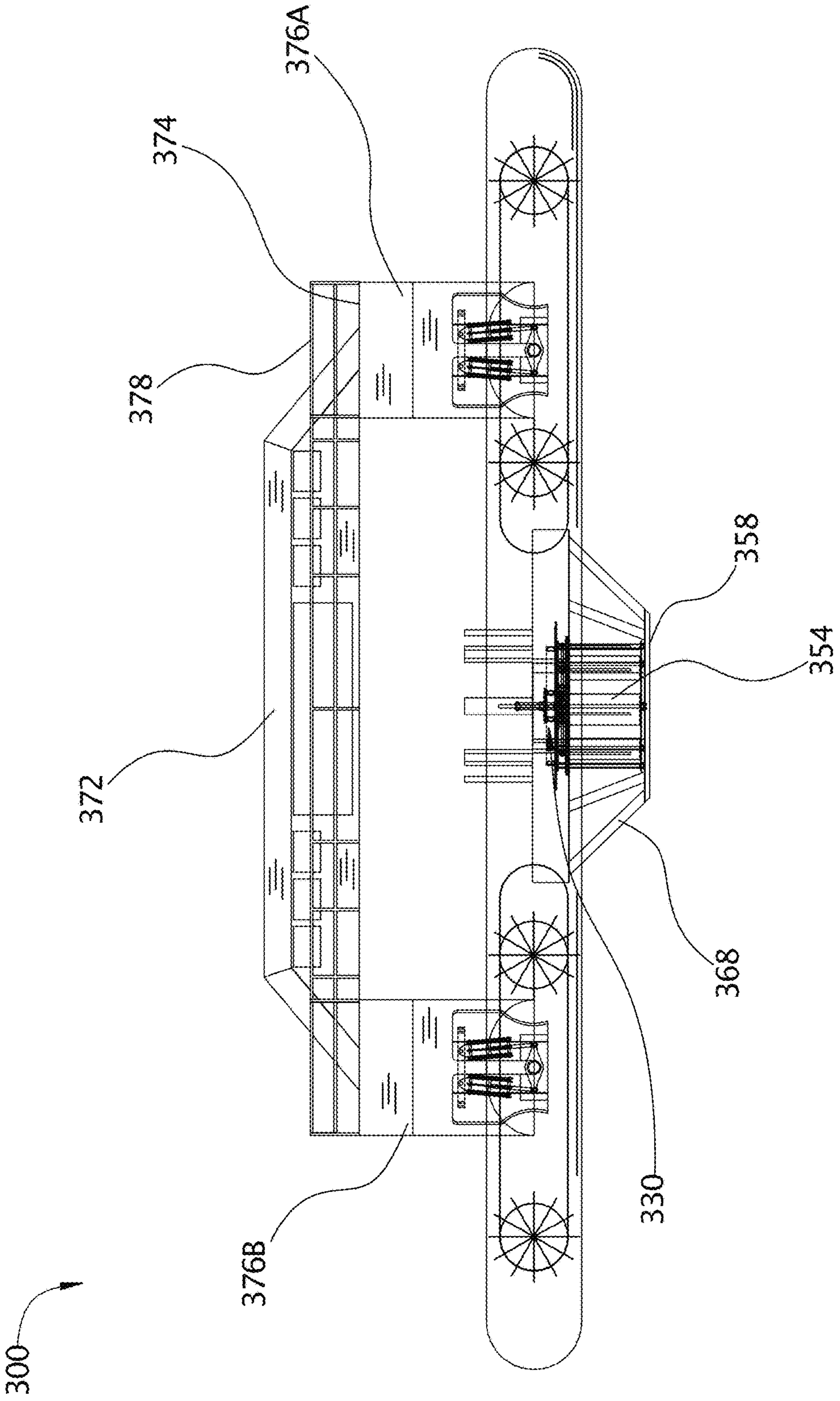
FIG. 16 illustrates a side elevation view of an ocean wave and tidal current energy conversion system.

As shown in FIG. 16, the energy conversion system 300, in some embodiments, may include a cabin 372 that may include one or more windows that rests on a platform 374. The platform 374 may comprise a first leg 376A, a second leg 376B, a third leg (not shown), and a fourth leg (not shown). The first and second legs 376A, 376B may be coupled to the first vessel 302. The third and fourth legs may be coupled to the second vessel 304. The platform 374 may extend between the first and second vessels 302, 304. Further, an upper surface of the platform 374 may comprise guardrails 378. The cabin 372 may include mechanical and electrical components, sleeping quarters, etc. The housing, vessels, frame members, cylinders, supports, and any other components may have high solids epoxy primer, urethane topcoats, marine bottom paints, sacrificial zinc anodes, or some combination thereof, which will help prevent most marine growth.

Figure 17:
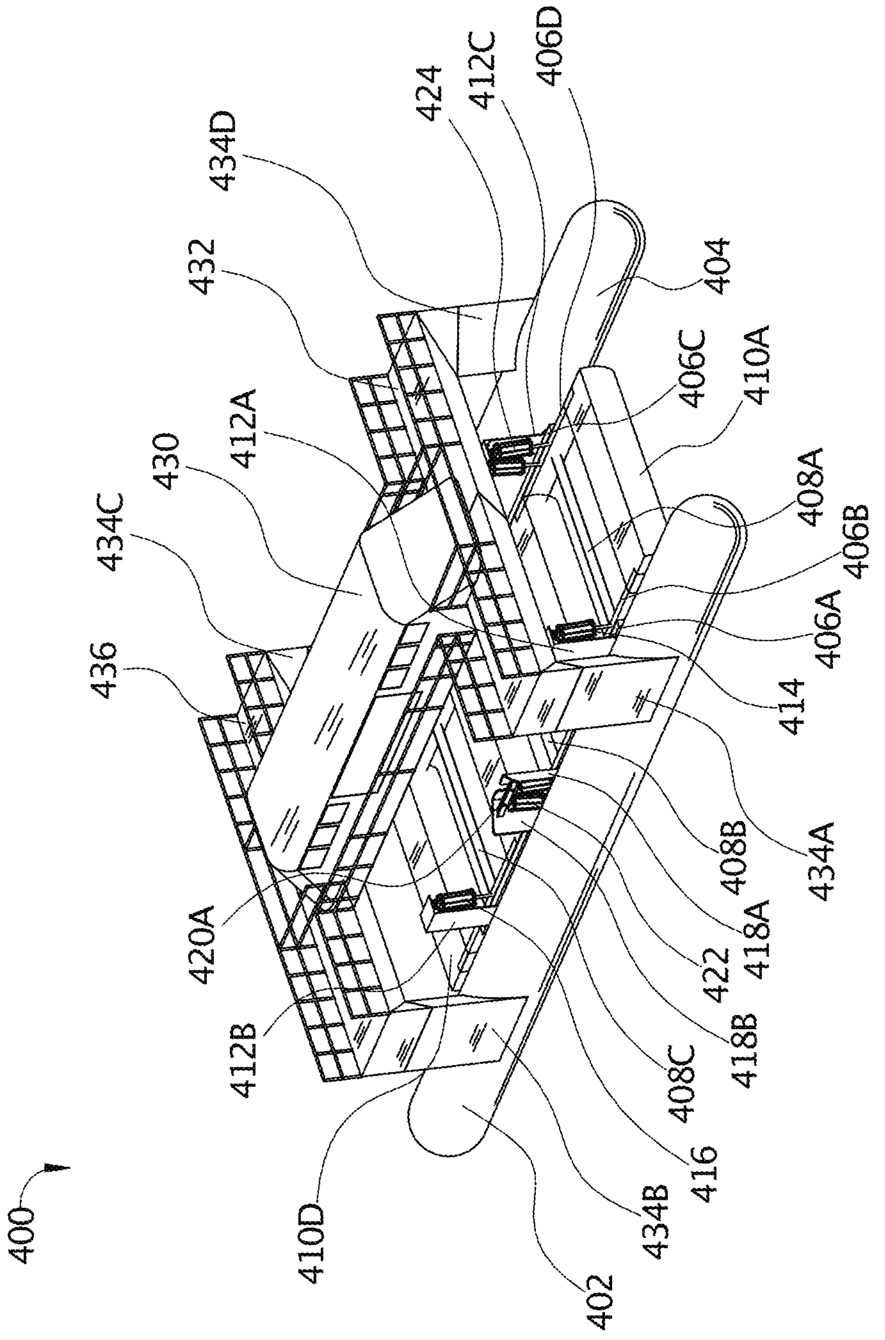
FIG. 17 illustrates a top, side perspective view of an ocean wave and tidal current energy conversion system.
Figure 18:
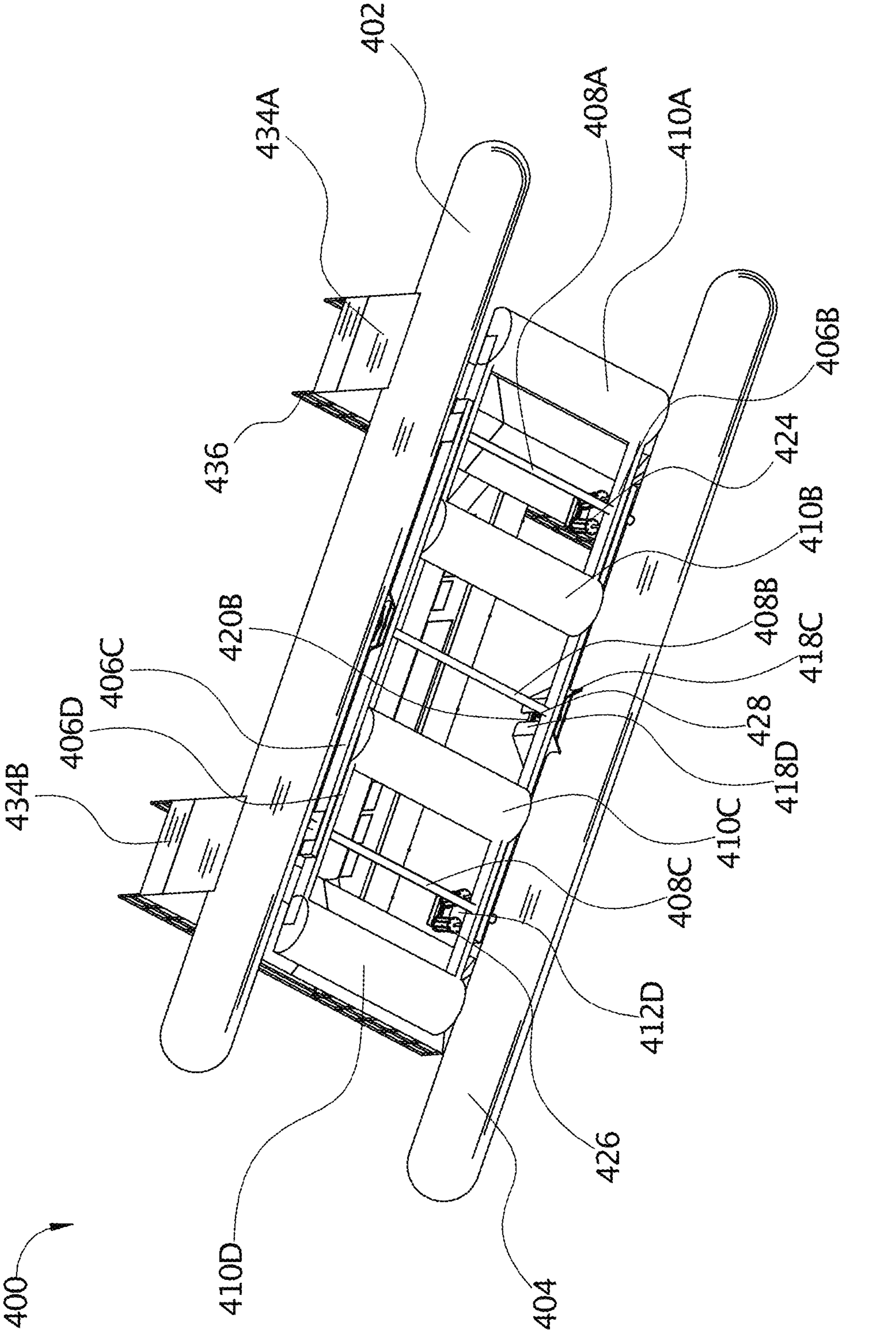
FIG. 18 illustrates a bottom perspective view of an ocean wave and tidal current energy conversion system.

As shown in FIGS. 17-18, in one embodiment, an energy conversion system 400 comprises a first vessel 402 (e.g., pressure tank) and a second vessel 404 (e.g., pressure tank), the first vessel 402 being parallel and spaced apart from the second vessel 404. The first and second vessels 402, 404 may be cylindrically shaped and sealed on each end of the vessels 402, 404 so as to have buoyancy and receive pressurized gases. In other embodiments, the first and second vessels 402, 404 may be rectangular or any other shape. In some embodiments, the first and second vessels 402, 404 may be conventional propane tanks, or other types of tanks. The first and second vessels 402, 404 may be a variety of lengths and circumferences to store pressurized gases, such as hydrogen.

Proximate the first vessel 402, there may be a first support 406A and a second support 406B. The first support 406A may be nearest the first vessel 402 and be generally rectangular-shaped. The first support 406A may be parallel to the first vessel 402. The second support 406B may be removably attachable to the first support 406A. The second support 406B may be longer than the first support 406A. The second support 406B may be positioned nearer the second vessel 404 than the first support 406A. The second support 406B may be generally rectangular in shape. The first and second supports 406A, 406B may both be shorter in length than the first and second vessels 402, 404. Proximate the second vessel 404, there may be a third support 406C and a fourth support 406D. The third support 406C may be nearest the second vessel 404 and be generally rectangular-shaped. The third support 406C may be parallel to the second vessel 404. The fourth support 406D may be removably attachable to the third support 406C. The fourth support 406D may be longer than the third support 406C. The fourth support 406D may be positioned nearer the first vessel 402 than the third support 406C. The fourth support 406D may be generally rectangular in shape. The third and fourth supports 406C, 406D may both be shorter in length than the first and second vessels 402, 404.

The first, second, third, and fourth supports 406A-406D may couple to the first and second vessels via a first axle 408A, a second axle 408B, and a third axle 408C. The axles 408A-408C may pass through the first, second, third, and fourth supports 406A-406D and couple to the first and second vessels 402, 404, being perpendicular thereto.

A first member 410A, a second member 410B, a third member 410C, and a fourth member 410D may be coupled to and interposed between the second and fourth supports 406B, 406D. The first, second, third, and fourth members 410A-410D may be spaced apart equal distances and be positioned perpendicular to the second and fourth supports 406B, 406D.

Further, the first vessel 402 may comprise a first bracket 412A and a second bracket 412B coupled thereto. The first and second brackets 412A, 412B may be generally L-shaped brackets. The first and second brackets 412A, 412B may comprise and couple to one or more first hydraulic cylinders 414 and one or more second hydraulic cylinders 416, respectively. In addition, the one or more first hydraulic cylinders 414 and one or more second hydraulic cylinders 416 may each couple to the second support 406B. The first vessel 402 may also include a first shield 418A, a second shield 418B, and a first shield bracket 420A interposed between the first and second shields 418A, 418B. The first and second shields 418A, 418B may protect one or more third hydraulic cylinders 422, which may be positioned between the first vessel 402 and the first and second shields 418A, 418B. The first shield bracket 420A may receive the one or more third hydraulic cylinders 422. The one or more hydraulic third cylinders 422 may also be coupled to the second support 406B.

Further, the second vessel 404 may comprise a third bracket 412C and a fourth bracket 412D coupled thereto. The third and fourth brackets 412C, 412D may be generally L-shaped brackets. The third and fourth brackets 412C, 412D may comprise and couple to one or more fourth hydraulic cylinders 424 and one or more fifth hydraulic cylinders 426, respectively. In addition, the one or more fourth hydraulic cylinders 424 and one or more fifth hydraulic cylinders 426 may each couple to the fourth support 406D. The second vessel 404 may also include a third shield 418C, a fourth shield 418D, and a second shield bracket 420B interposed between the third and fourth shields 418C, 418D. The third and fourth shields 418C, 418D may protect one or more six hydraulic cylinders 428, which may be positioned between the second vessel 404 and the third and fourth shields 418C, 418D. The second shield bracket 420B may receive the one or more sixth hydraulic cylinders 428. The one or more six hydraulic cylinders 428 may also be coupled to the fourth support 406D. The first axle 408A, second axle 408B, and third axle 408C, with the first, second, third, and fourth members 410A-410D, may rotate back and forth (e.g., teeter totter motion), which allows relative motion energy to be transferred so as to create hydraulic oil pressure via the hydraulic cylinders.

The energy conversion system 400 may also comprise a cabin 430 that may include one or more windows that rests on a platform 432. The platform 432 may comprise a first leg 434A, a second leg 434B, a third leg 434C, and a fourth leg 434D. The first and second legs 434A, 434B may be coupled to the first vessel 402. The third and fourth legs 434C, 434D may be coupled to the second vessel 404. The platform 432 may extend between the first and second vessels 402, 404. Further, an upper surface of the platform 432 may comprise guardrails 436. The cabin 430 may include mechanical and electrical components, sleeping quarters, etc. The housing, vessels, frame members, cylinders, supports, and any other components may have high solids epoxy primer, urethane topcoats, marine bottom paints, sacrificial zinc anodes, or some combination thereof, which will help prevent most marine growth. It will be appreciated that the energy conversion system 400 may be coupled to other energy conversion systems.

Figure 19:
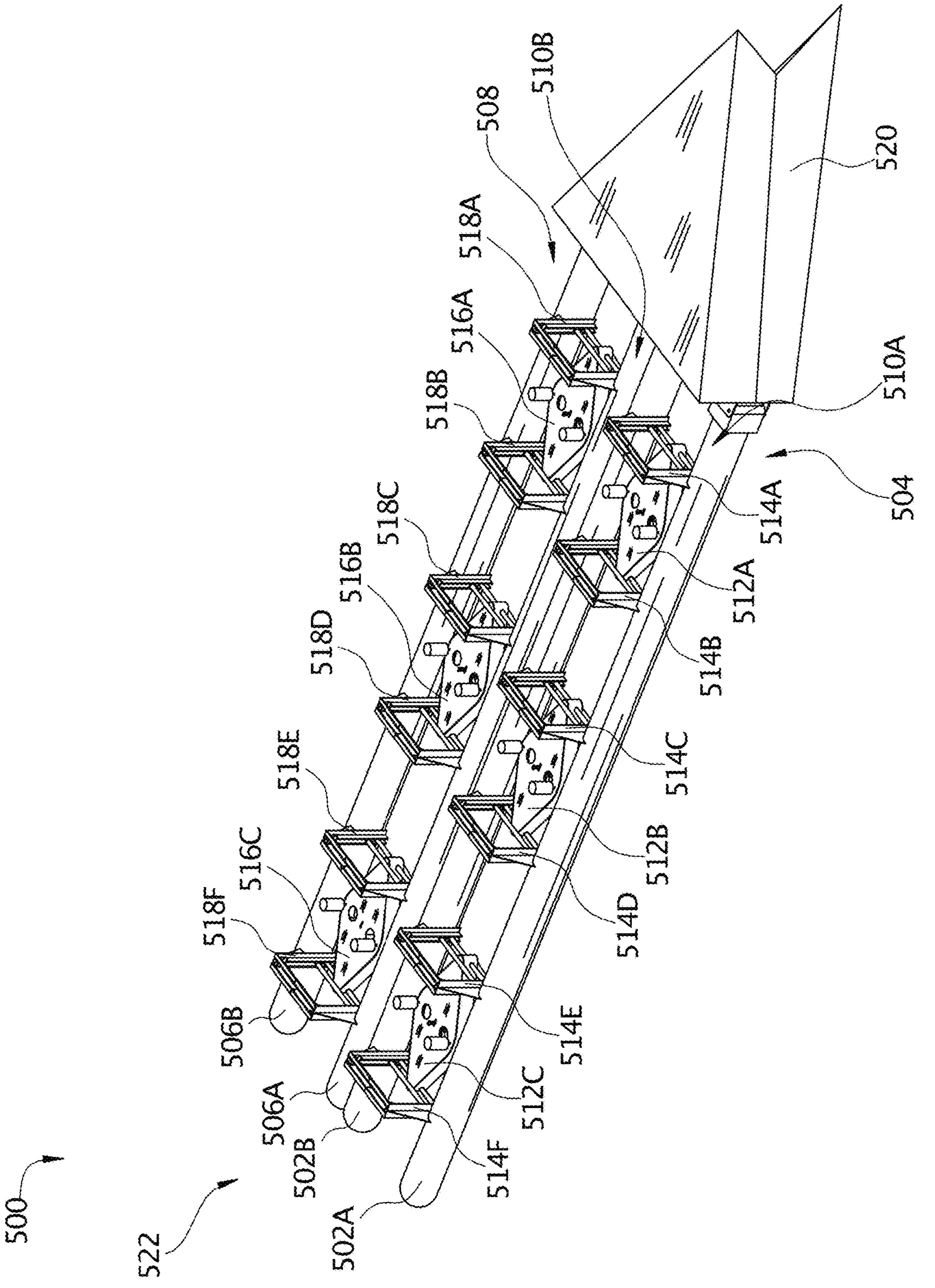
FIG. 19 illustrates a perspective view of an ocean wave and tidal current energy conversion system.
Figure 20:
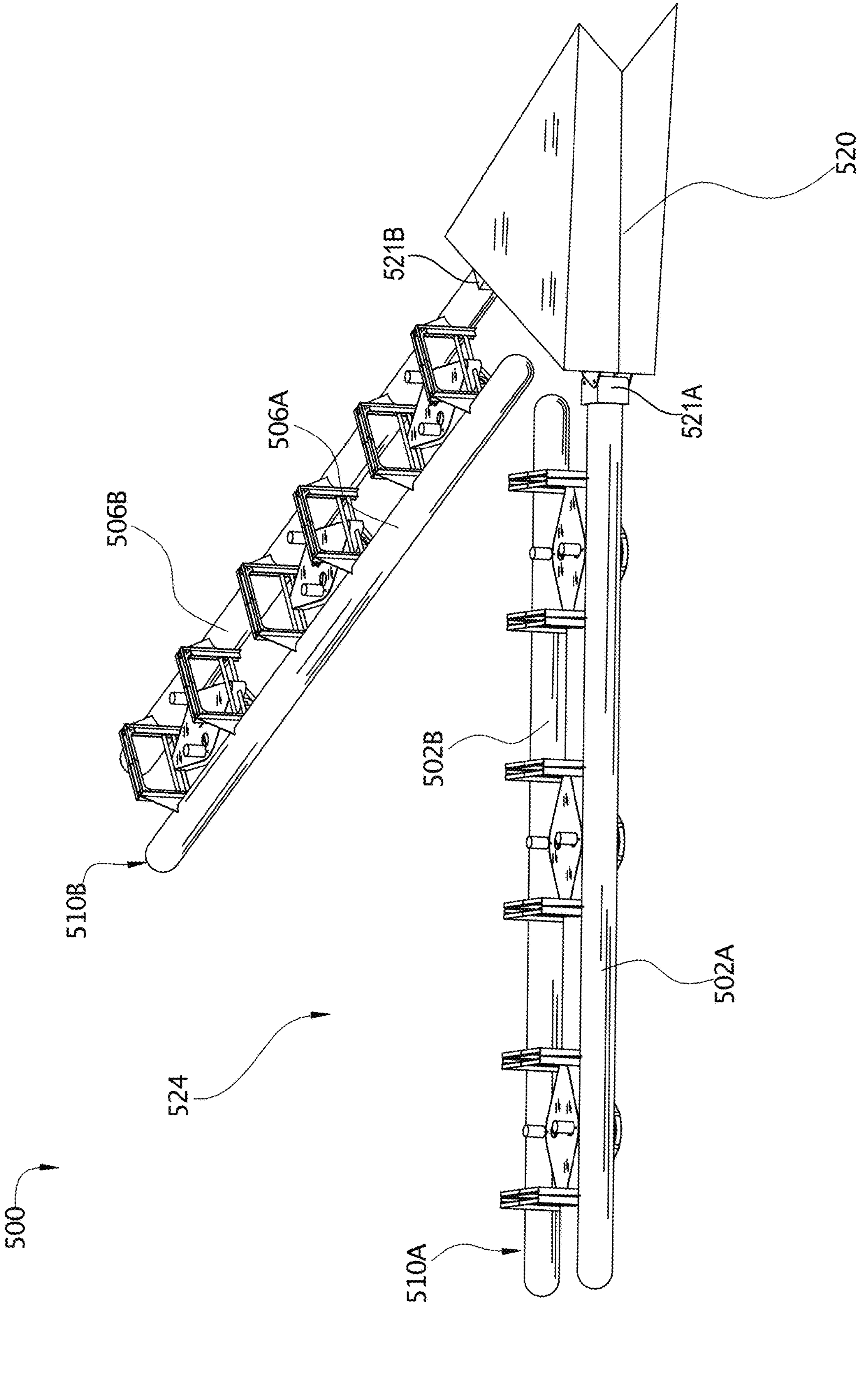
FIG. 20 illustrates a perspective view of an ocean wave and tidal current energy conversion system.
Figure 21:
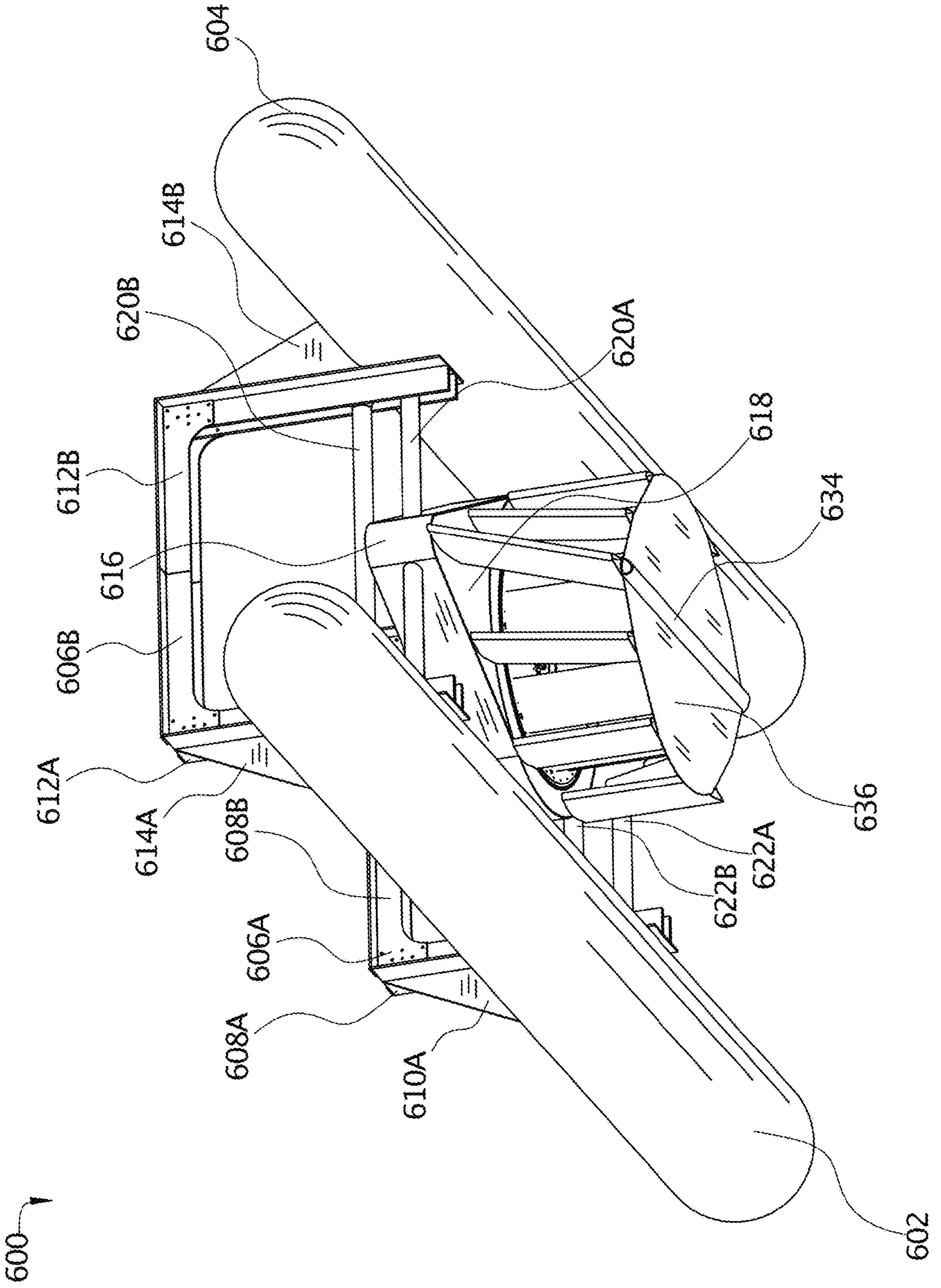
FIG. 21 illustrates a bottom front perspective view of an ocean wave and tidal current energy conversion system.
Figure 22:
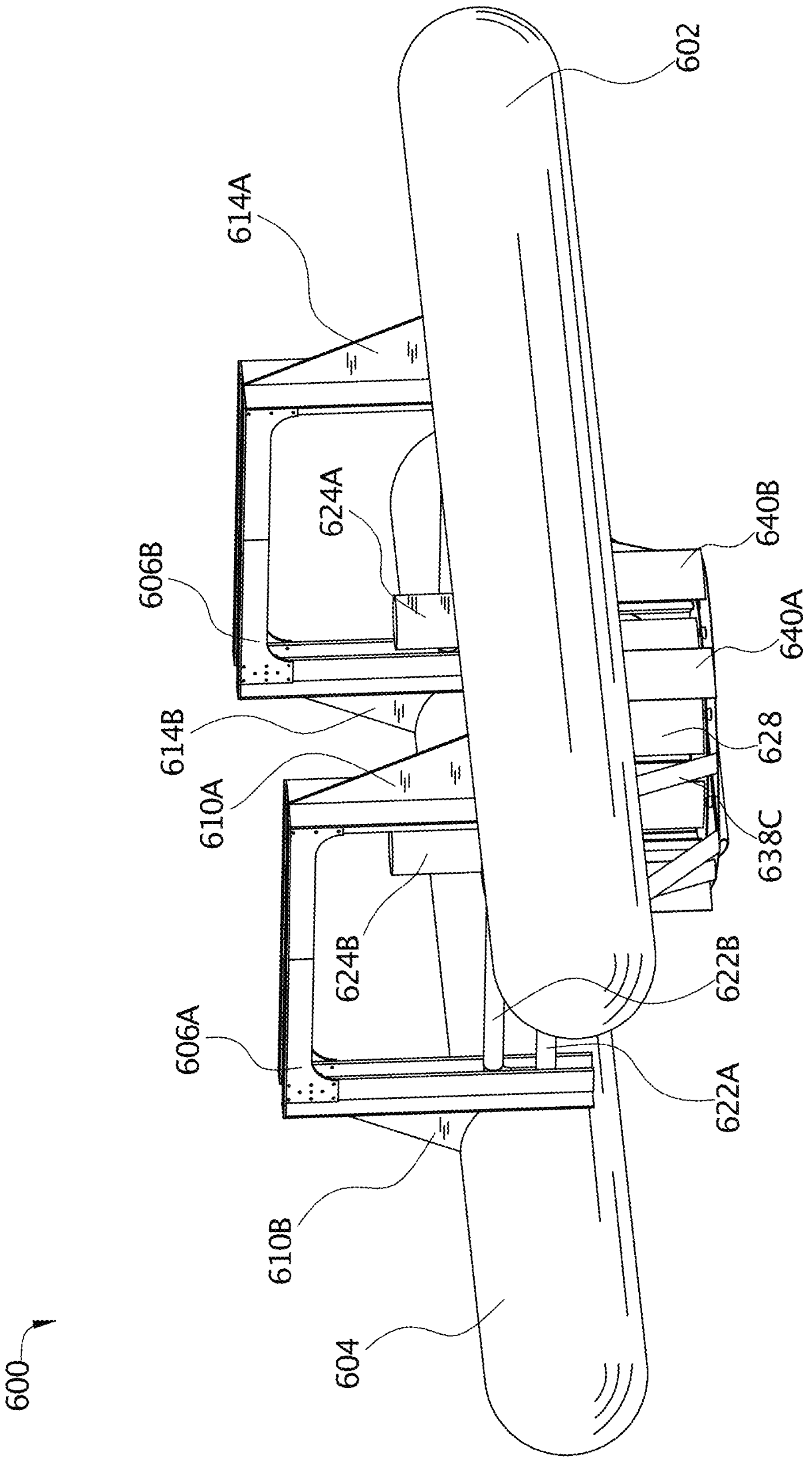
FIG. 22 illustrates a left side perspective view of an ocean wave and tidal current energy conversion system.
Figure 23:
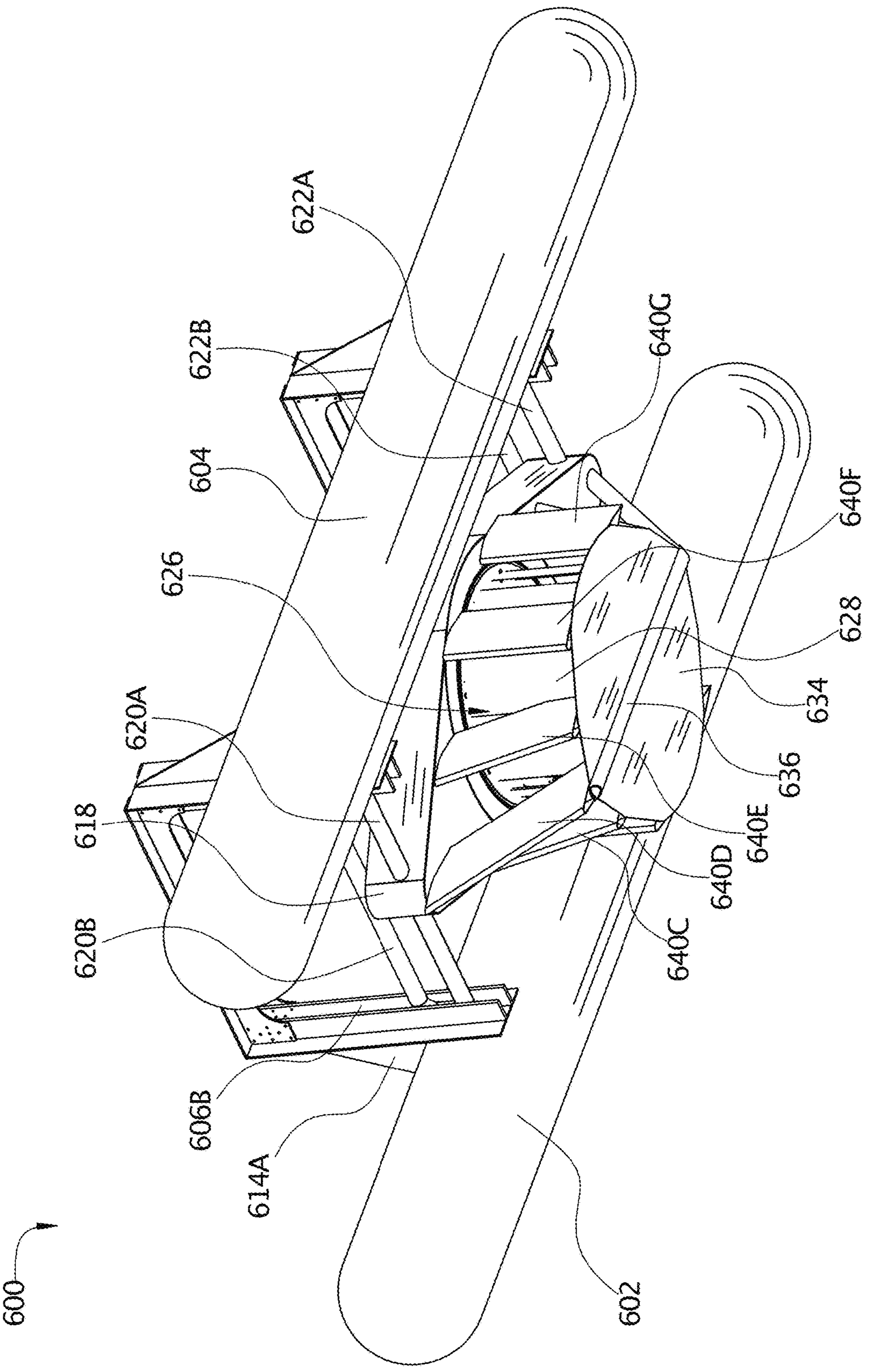
FIG. 23 illustrates a bottom perspective view of an ocean wave and tidal current energy conversion system.
Figure 24:
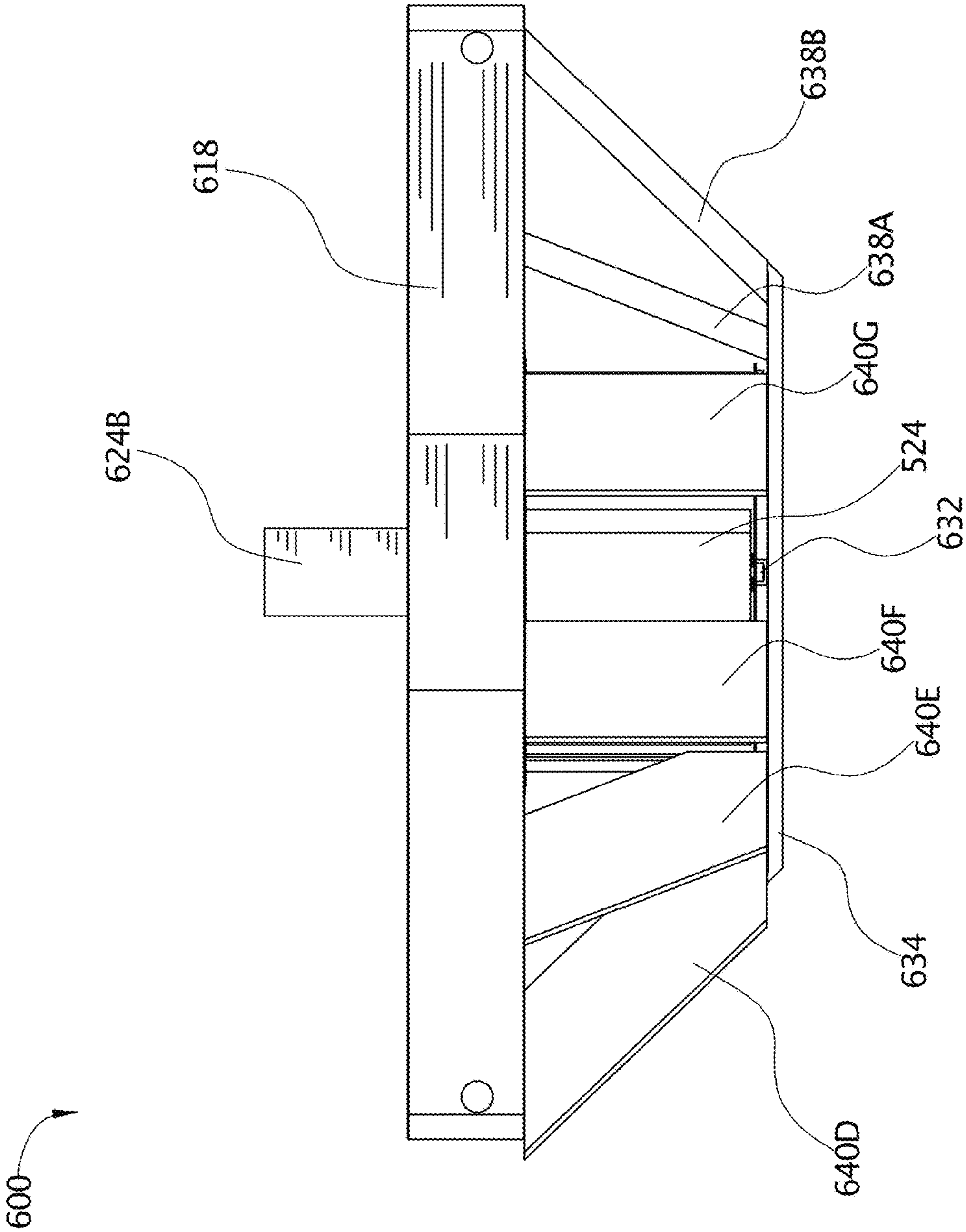
FIG. 24 illustrates a side elevation view of a housing, blades, and inlet guide veins of an ocean wave and tidal current energy conversion system.
Figure 25:
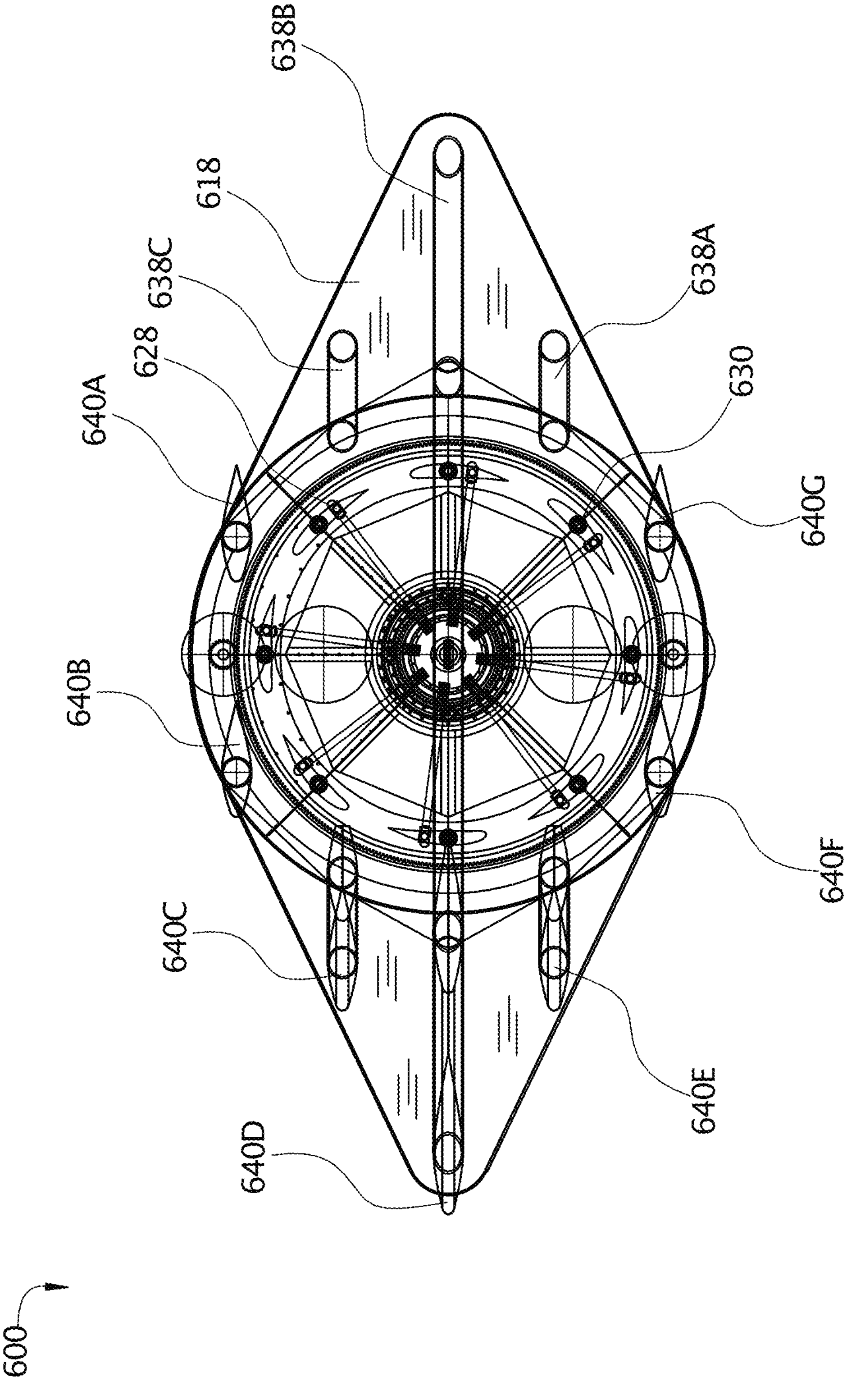
FIG. 25 illustrates a top plan view of a housing, blades, and inlet guide veins of an ocean wave and tidal current energy conversion system.
Figure 26:
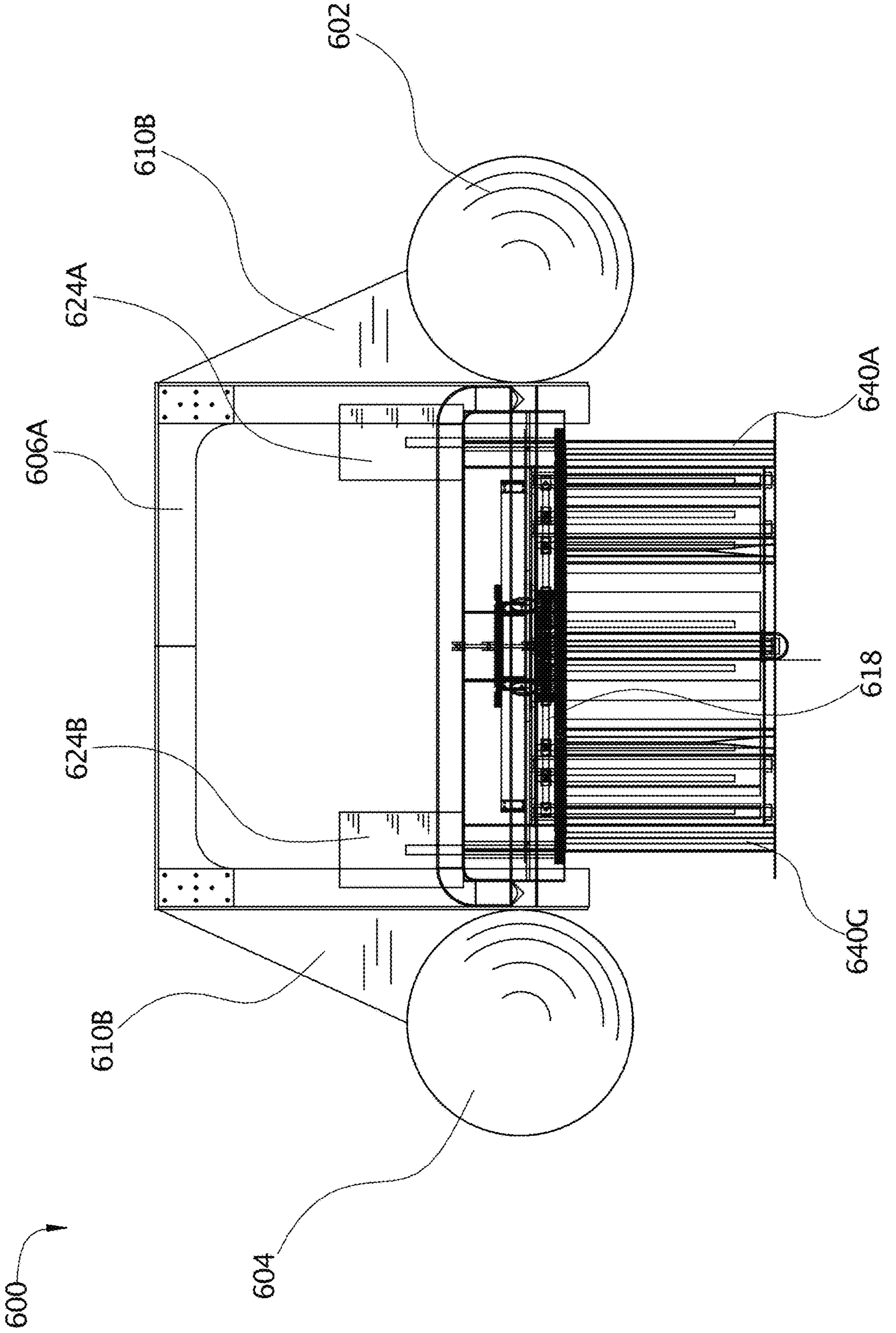
FIG. 26 illustrates a rear elevation view of an ocean wave and tidal current energy conversion system.
Figure 27:
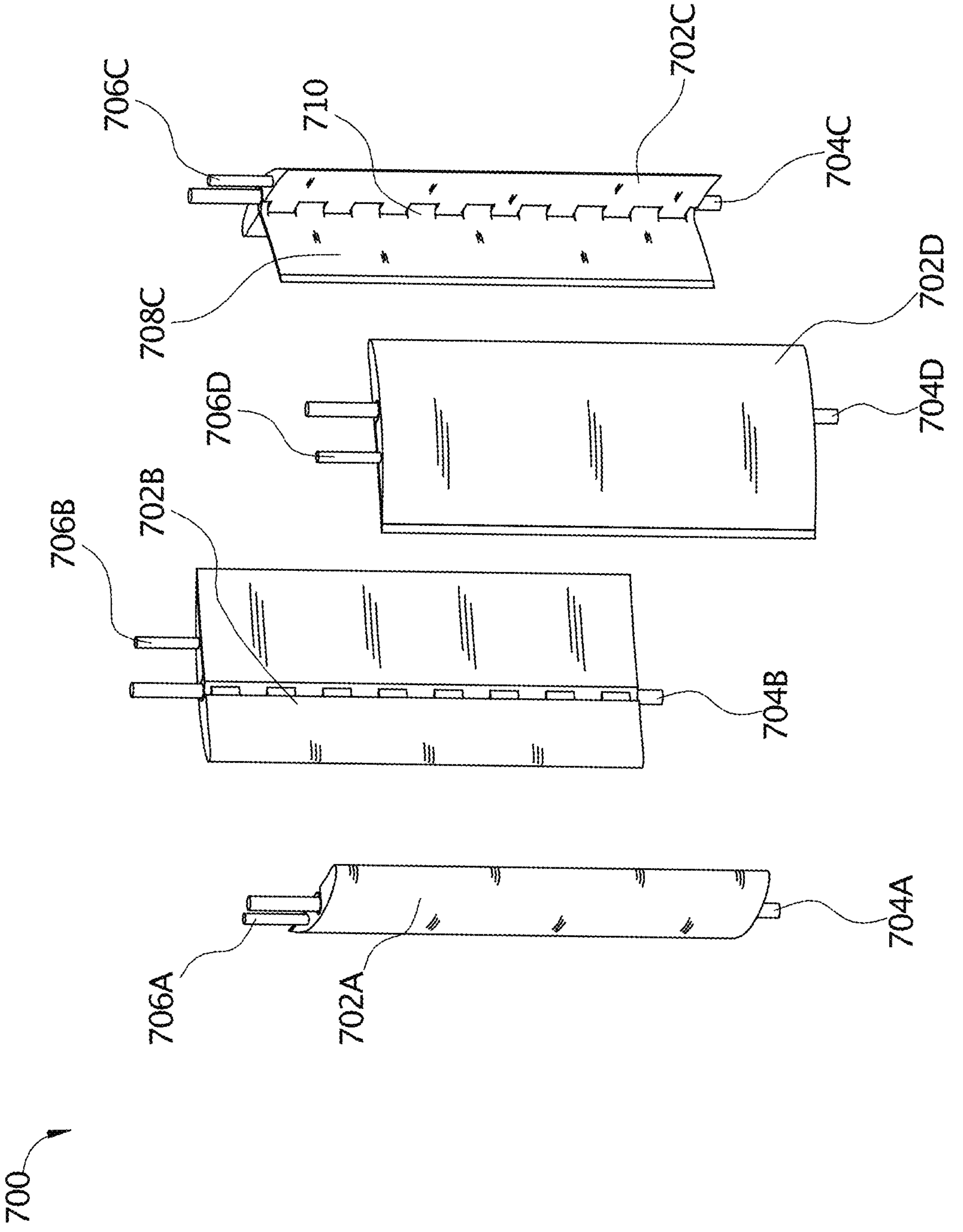
FIG. 27 illustrates a perspective view of blades of an ocean wave and tidal current energy conversion system.
Figure 28:
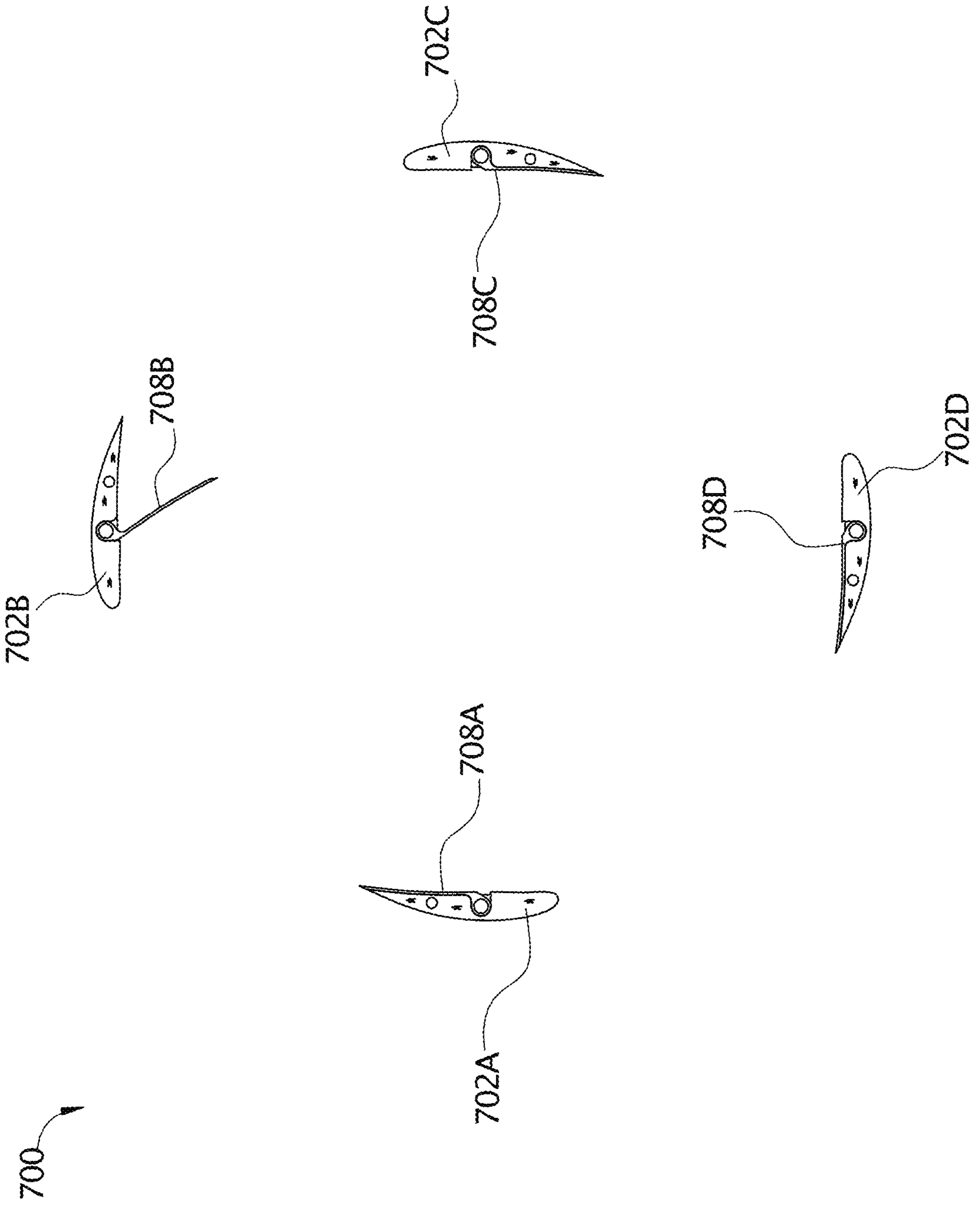
FIG. 28 illustrates a top plan view of blades of an ocean wave and tidal current energy conversion system.
Figure 29:
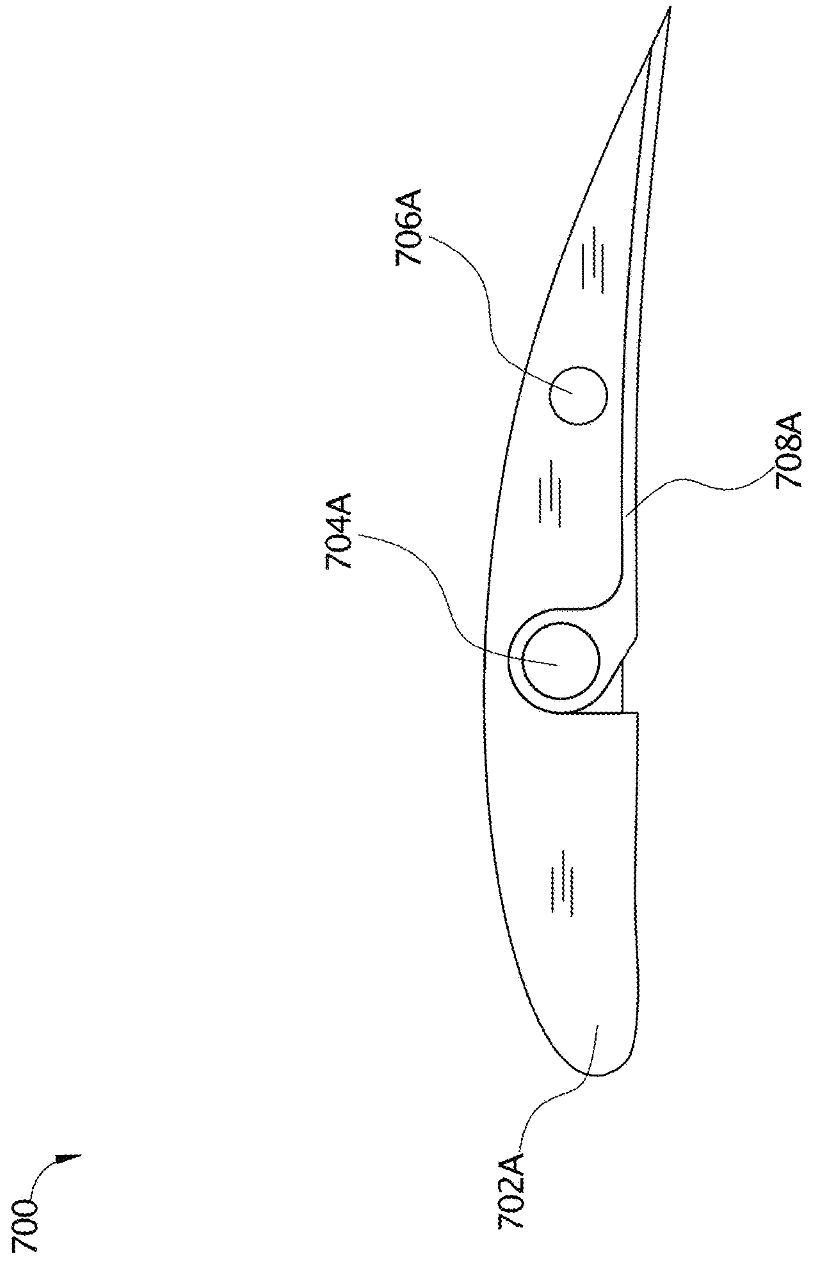
FIG. 29 illustrates a top plan view of blade of an ocean wave and tidal current energy conversion system.
Figure 30:
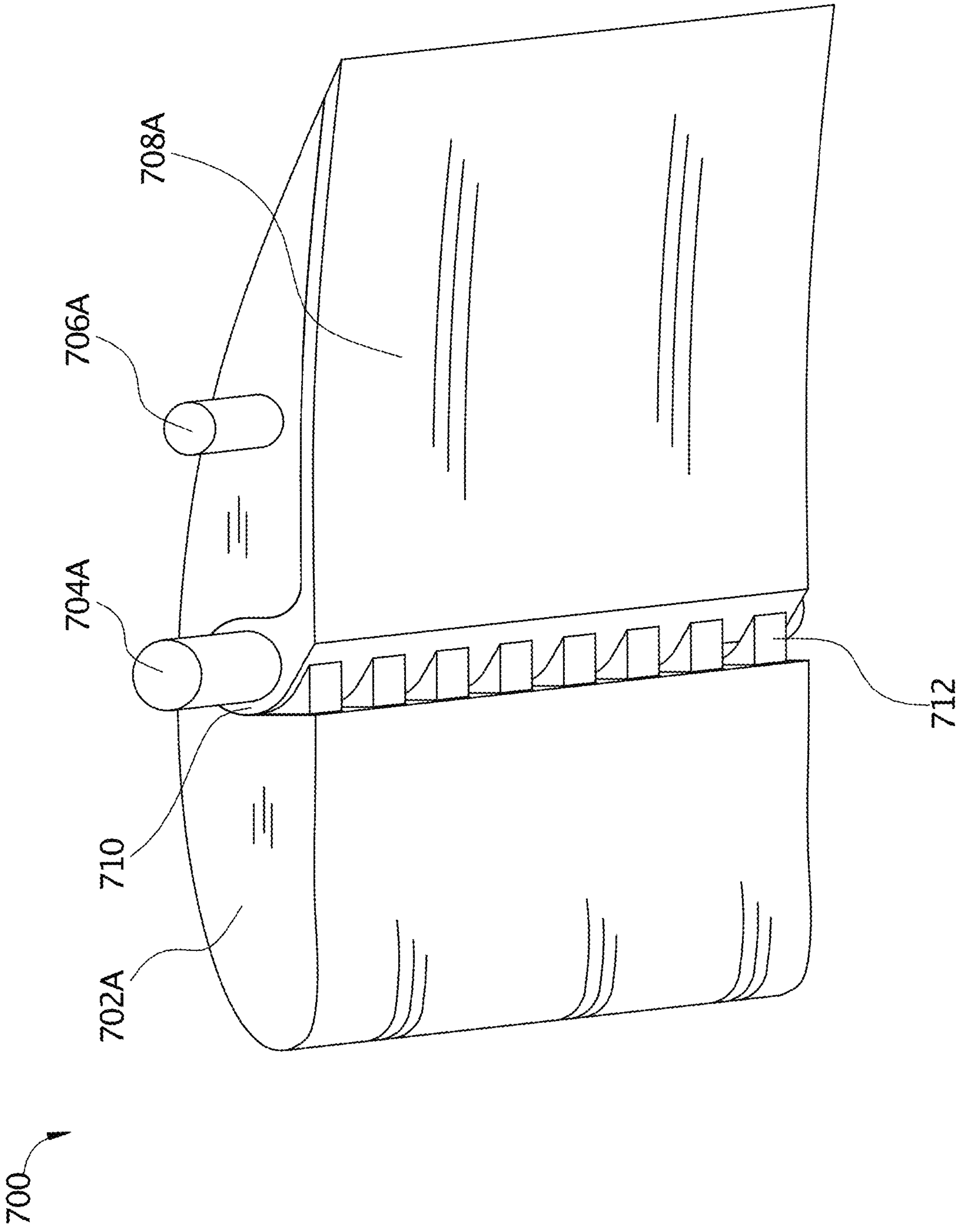
FIG. 30 illustrates a perspective view of blade of an ocean wave and tidal current energy conversion system.
Figure 31:
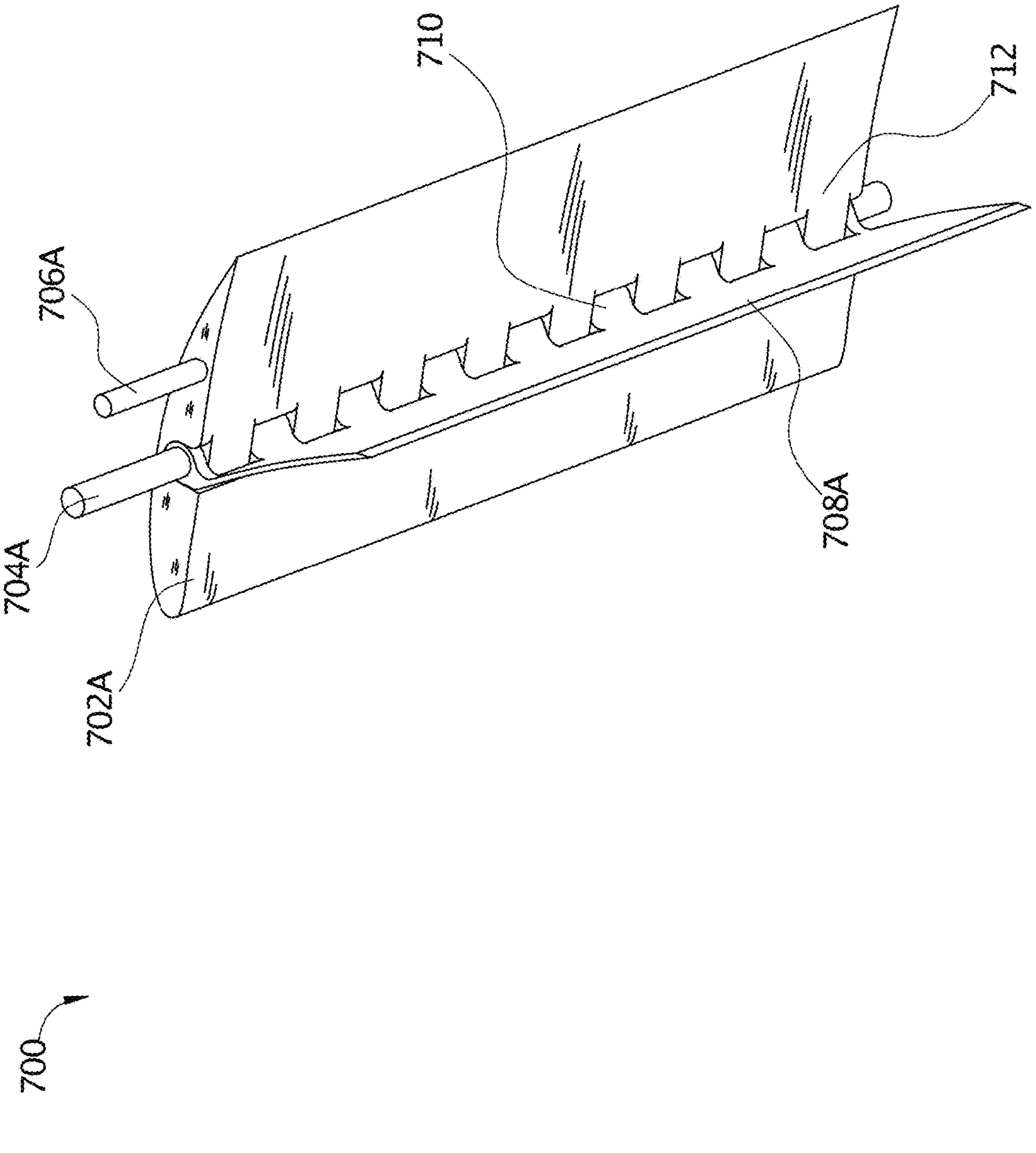
FIG. 31 illustrates a side perspective view of a blade of an ocean wave and tidal current energy conversion system.

As shown in FIGS. 19-20, in one embodiment, an energy conversion system 500 may comprise a first vessel 502A and a second vessel 502B on a first side 504 and a third vessel 506A and a fourth vessel 506B on a second side 508. The first and second vessels 502A, 502B may create a first unit 510A, and the third and fourth vessels 506A, 506B may create a second unit 510B. Interposed between the first and second vessels 502A, 502B may be a plurality of first turbines 512A-512C and a plurality of first supports 514A-514F (similar to the turbine 320 and supports 306 as shown in embodiment 300). In addition, interposed between the third and fourth vessels 506A, 506B may be a plurality of second turbines 516A-516C and a plurality of second supports 518A-518F (similar to the turbine 320 and supports 306 as shown in embodiment 300). The first unit 510A and second unit 510B may both be hingedly coupled to a first member 520 via a first hinge bracket 521A and a second hinge bracket 521B, respectively. The first member 520 may be generally triangular in shape and configured to act as an ice breaker bow to deal with break-up ice moving in and out of an inlet. The first and second units 510A, 510B may be in a first position 522, hinged inward, or parallel to each other, for towing the energy conversion system 500 into location and then moved to a second position 524, where the first and second units 510A, 510B are released and spread apart in a generally V-shaped formation.

In one embodiment, as illustrated in FIGS. 21-26, an energy conversion system 600 comprises a first vessel 602 (e.g., pressure tank) and a second vessel 604 (e.g., pressure tank), the first vessel 602 being parallel and spaced apart from the second vessel 604. The first and second vessels 602, 604 may be cylindrically shaped and sealed on each end of the vessels 602, 604 so as to have buoyancy and receive pressurized gases. In other embodiments, the first and second vessels 602, 604 may be rectangular or any other shape. In some embodiments, the first and second vessels 602, 604 may be conventional propane tanks, or other types of tanks. The first and second vessels 602, 604 may be a variety of lengths and circumferences to store pressurized gases, such as hydrogen.

A first support 606A may be positioned at a first end of the first and second vessels 602, 604. The first support 606A may include a first frame 608A and a second frame 608B. The first and second frames 608A, 608B may be coupled together with one or more first brackets. In some embodiments, the first and second frames 608A, 608B may be coupled together via welding or any other fastening mechanism. The one or more first brackets may interact with and be positioned on an inner surface of the first support 606A at a first upper side and a second upper side. The one or more first brackets may also interact with a first channel member and a second channel member, both of which are coupled to the first support. The first and second channel members may be u-shaped so as to create a first channel in the first channel member and a second channel in the second channel member. The first support 606A may have a first vessel support 610A on one side and a second vessel support 610B on a side opposite the first vessel support 610A. The first vessel support 610A may rest upon and be coupled to an upper surface of the first vessel 602. The second vessel support 610B may rest upon and be coupled to an upper surface of the second vessel 604. The first support 606A may be perpendicular to and interposed between the first and second vessels 602, 604.

A second support 606B may be positioned at a second end of the first and second vessels 602, 604. The second support 606B may include a third frame 612A and a fourth frame 612B. The third and fourth frames 612A, 612B may be coupled together with one or more second brackets. In some embodiments, the third and fourth frames 612A, 612B may be coupled together via welding or any other fastening mechanism. The one or more second brackets may interact with and be positioned on an inner surface of the second support 606B at a third upper side and a fourth upper side. The one or more second brackets may also interact with a third channel member and a fourth channel member, both of which are coupled to the second support 606B. The third and fourth channel members may be u-shaped so as to create a third channel in the third channel member and a fourth channel in the fourth channel member. The second support 606B may have a third vessel support 614A on one side and a fourth vessel support 614B on a side opposite the third vessel support 614A. The third vessel support 614A may rest upon and be coupled to an upper surface of the first vessel 602. The fourth vessel support 614B may rest upon and be coupled to an upper surface of the second vessel 604. The second support 606B may be perpendicular to and interposed between the first and second vessels 602, 604.

Positioned between and coupled to the first and second supports 606A, 606B is a turbine 616 (e.g., a vertical axis turbine). The turbine 616 may comprise a housing 618 that may be coupled to a first rod 620A and interacts with a second rod 620B at one end of the housing 618. The first rod 620A and second rod 620B may be positioned in the third and fourth channels, being adjustably secured to the third and fourth channel members. That is, the first and second rods 620A, 620B may be adjusted in height along the third and fourth channels, thereby allowing the turbine 616 to move. The first rod 620A may pass through the housing 618 while the second rod 620B rests upon an upper surface of the housing 618. Further, the housing 618 may be coupled to a third rod 622A and interact with a fourth rod 622B at an end of the housing 618 opposite insertion of the first rod 620A. The third rod 622A and fourth rod 622B may be positioned in the first and second channels, being adjustably secured to the first and second channel members. That is, the third and fourth rods may be adjusted in height along the first and second channels, thereby allowing the turbine 616 to move. The third rod 622A may pass through the housing 618 while the fourth rod 622B rests upon an upper surface of the housing 618. It will be appreciated that the turbine 616 may be moved up and down via cables and winches or by any other mechanisms. The upper surface of the housing 618 may comprise a first cylinder 624A (e.g., generators or hydraulic pumps) and a second cylinder 624B (e.g., generators or hydraulic pumps). While two cylinders are shown, it will be appreciated that any number of cylinders may be used, such as one or three.

Similar to the energy conversion system 300 as shown at least in FIG. 14, the housing 618 may include substantially the same components as those found in FIG. 14. The housing 618 may include a rotating portion 626 of the housing 618. The rotating portion 626 is capable of rotating 360 degrees. The rotating portion 626 may comprise a bearing and a controller, such as a cyclic controller. The controller may pass through the top of the housing 618 and through a second housing. The second housing, on an outer edge, may have gear teeth to interact with a gear to promote rotation. Positioned below and coupled to a lower surface of the second housing, may be a third housing. A first plate may rest on an upper surface of the third housing and extend to an inner wall of the housing 618. On an upper surface of the first plate, support wings may extend from an outer surface of the second housing to the inner surface of the housing 618. The third housing may be open to, or is accessible through, the bottom of the second housing. As such, the controller may descend through the second housing and into the third housing, where the controller couples to a second plate (e.g., a swashplate). The second plate can be adjusted in rotation to adapt to the inflow direction as well as move in all directions by means of the controller to control the rotational speed and torque. The second plate may be configured to interact with and be secured to first rods on a lower surface of the second plate via first fasteners that protrude through the third housing to second fasteners, where one or more second rods may also couple to the second fasteners. The one or more second rods may be perpendicular to the first rods and pass through a third plate, a fourth plate, and the housing to blades 628 (e.g., vertical airfoil shaped blades), the blades 628 being located underneath the housing 618. The blades 628 are on a rotating vertical axis where the pitch of each blade 628 is controlled by the controller. The controller adjusts each blade 628 for the maximum take-off power of the passing ocean or river current. In some embodiments, there may be one or more blades. The fourth plate may comprise gear teeth that interact with a first gear and a second gear, which are configured to rotate the rotating portion 626. The blades 628 may couple to axles 630 (e.g., pivot axles). The pivot axles 630, at an upper end, may couple to a ring that is interposed between the first plate and third plate. In addition, the pivot axles 630 may pass through the length of the blades 628 and couple to a fifth plate. The fifth plate may comprise a turbine axle 632 that couples to a bottom plate 634. The bottom plate 634 may include a fin 636 on its lower surface. The bottom plate 634 may be coupled to a lower surface of the housing 618 via a plurality of support arms 638A-638C on a rear of the bottom plate 634. While three support arms are shown, it will be understood that there may be more or less than three supports.

Circumscribing a majority of the blades 628 may be a first inlet guide vein 640A, a second inlet guide vein 640B, a third inlet guide vein 640C, a fourth inlet guide vein 640D, a fifth inlet guide vein 640E, a sixth inlet guide vein 640F, and a seventh inlet guide vein 640G. The inlet guide veins 640A-640G may be coupled (e.g., pivotally or rotatably coupled) to an upper surface of the bottom plate 634 and a lower surface of the housing 618 via, for example, inlet guide axles 641. The first and second inlet guide veins 640A, 640B may be positioned on a first side of the housing 618. The sixth and seventh inlet guide veins 640F, 640G may be positioned on a second side of the housing 618. The third and the fifth inlet guide veins 640C, 640E may be positioned on the first and second sides of the housing, respectively, and toward a front of the housing 618 and the first and second vessels 602, 604. The third and fifth inlet guide veins 640C, 640E may also be angled forward so as to couple to the lower surface of the housing 618. The fourth inlet guide vein 640D may be the vein nearest to the front of the housing 618. As discussed above, the inlet guide veins 640A-640G may be coupled to a lower surface of the housing 618 and the bottom plate 634. While seven inlet guide veins are shown, it will be understood that there may be more or less than seven inlet guide veins, such as three. The inlet guide veins 640A-640G are shaped to redirect incoming water current (e.g., a hydrofoil shape). The inlet guide veins 640A-640G are configured to be located into incoming water current. In other words, the inlet guide veins 640A-640G are positioned at a front and side of the rotating portion 626 so as to guide the incoming, passing water to an improved angle of attack against the blades 628. The inlet guide veins 640A-640G are capable of directing water to create optimal efficiency of the system 600. The inlet guide veins 640A-640G may be adjustable until the optimal pitch angle for the passing water flow is found. At which point, the inlet guide veins 640A-640G are fixed or resting in the optimal position so as to move the passing water to the blades 628. The inlet guide veins 640A-640G may be moved to each of their optimal position by the water current. In some embodiments, the inlet guide veins 640A-640G may be moved to each of their optimal positions via an actuator, such as a motor, that is capable of rotating each vein. The housing 618 may each be V-shaped at both ends so as, in some embodiments, to act as an ice breaker bow to deal with break-up ice moving in and out of an inlet.

It will be appreciated that there may be two centers of rotation. In the first center of rotation, each blade 628 has the pivot axle 630 which follows a fixed circular path. In the second center of rotation, the rotating portion 626 varies in rotation depending on the position of the cyclic control, and the first rods extend from the second plate (e.g., cyclic swashplate) to a position on each blade 628 proximate the pivot axle 630.

The blades 628 may adjust to water current via both the pivot axles 630 and the first and second rods, which are controlled by the controller. Due to these adjustments, the system 600 is capable of capturing maximum energy. The housing, vessels, frame members, cylinders, supports, and any other components may have high solids epoxy primer, urethane topcoats, marine bottom paints, sacrificial zinc anodes, or some combination thereof, which will help prevent most marine growth.

In some embodiments, the hydraulic oil in the energy conversion system 100, 200, 300, 400, 500, 600 is pumped into a pressure accumulator that removes hydraulic surges and operates an electric generator. The electric generator may power an electrolysis batch system for the production of hydrogen that fills each vessel with hydrogen gas. In some embodiments, the vessels may receive hydrogen gas at a pressure of up to 250 PSI. In other embodiments, the vessels may receive more or less PSI. To transfer the compressed hydrogen, hoses may be used, if the systems are close to the shore, or a tender vessel may transfer hydrogen to a shore location.

The configuration of the energy conversion system 100, 200, 300, 400, 500, 600 in addition to the anchors, allows the system to be aligned with the oncoming waves so as to maximize efficiency of the system 100, 200, 300, 400, 500, 600. Waves and tidal current translate into transferred hydraulic pressure and flow via the system 100, 200, 300, 400, 500, 600. With the pressure and flow, the generators can produce electricity. Then the electricity can be used to produce hydrogen.

Figure 10:
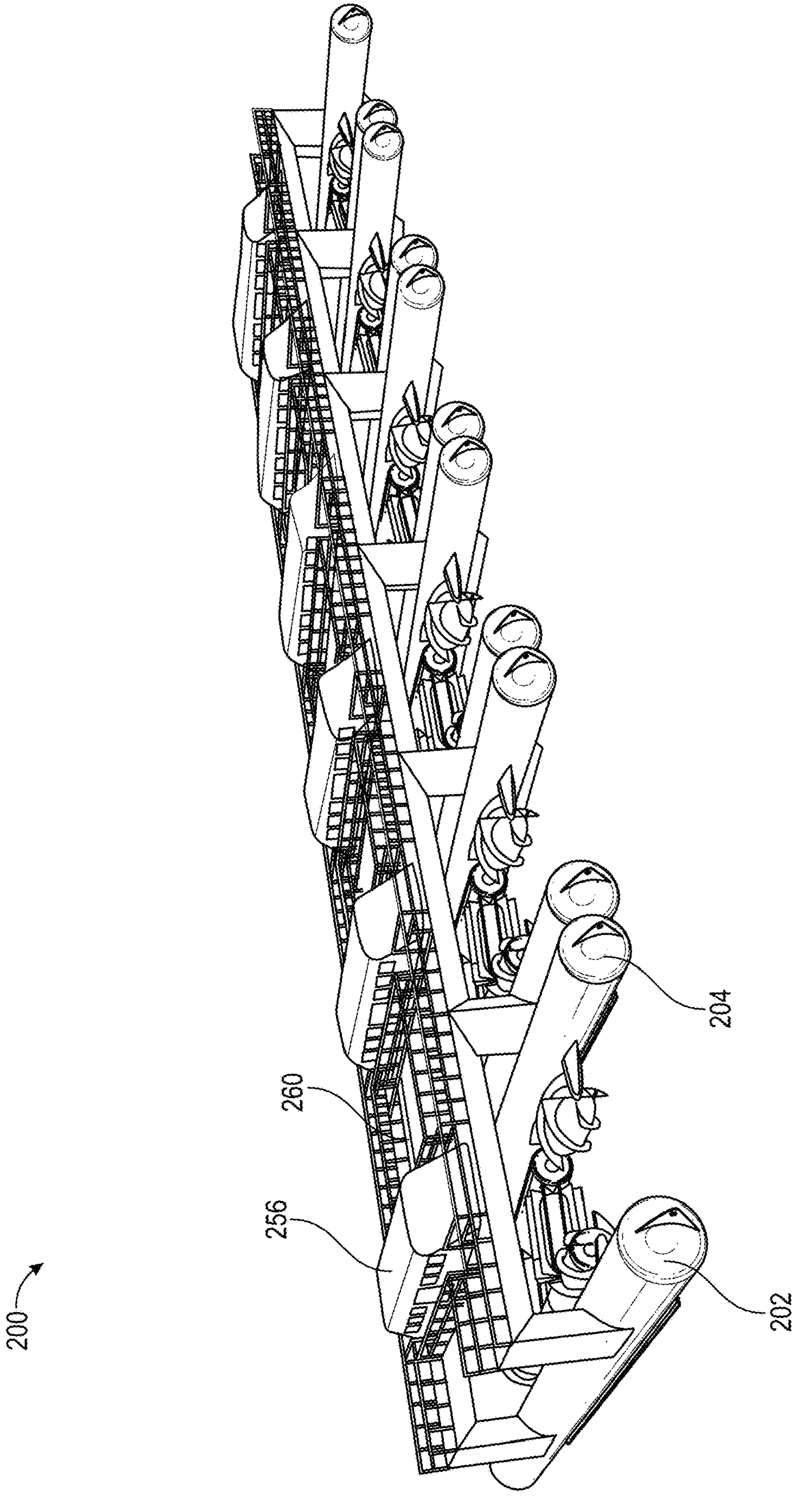
FIG. 10 illustrates a perspective view of multiple ocean wave and tidal current energy conversion systems.

It will be appreciated that the energy conversion system 100, 200, 300, 400, 500, 600 may be coupled to other energy conversion systems to create a breakwater (shown in FIG. 10). In some embodiments, the legs of the platforms may be coupled together so that a user may have a continuous platform to walk from system to system. The breakwater may help create better ecosystems for the aquatic species, calmer area for tourists or recreationists, and prevents shore erosion. There are many benefits that come from the energy conversion system 100, 200, 300, 400, 500, 600 some of which may include the following: no carbon footprint; oxygen is a byproduct of electrolysis; hydrogen is produced by existing energy and not hydrocarbon; when hydrogen is burned, water is created; any internal combustion engine that now uses hydrocarbons for fuel can use hydrogen which utilizes all forms of existing engines; cost effective; and available carbon credits as a tax benefit.

Further, in some embodiments, the energy conversion system 100, 200, 300, 400, 500, 600 may comprise solar panels positioned thereon to increase production. In some embodiments, the energy conversion system 100, 200, 300, 400, 500, 600 may comprise windmills to increase production.

As shown in FIGS. 27-31, in one embodiment, an energy conversion system 700, which may function with any of the components presented in any other embodiment disclosed herein, comprises blades 702A-702D (e.g., vertical airfoil shaped blades) with a first rod 704A-704D (e.g., pivot axle) that passes therethrough and a second rod 706A-706D. The blades 702A-702D being located underneath a housing, as described above.

The blades 702A-702D include pivotally coupled spoilers 708A-708D. The spoilers 708A-708D may include first fingers 710 that interact with second fingers 712 that are positioned on the blades 702A-702D. The first and second fingers 710, 712 are positioned between each other to aid in the spoilers 708A-708D pivoting. The first fingers 710 may include first apertures and the second fingers 712 may include second apertures. The first rod 704A-704D may pass through the first apertures and the second apertures, thereby allowing the spoilers 708A-708D to pivot outward away from a resting position where the spoiler 708A-708D is contacting an inner surface of the blade 702A-702D to a second position, where the spoiler 708A-708D is positioned away from the blade 702A-702D.

The blades 702A-702D are on a rotating vertical axis where the pitch of each blade 702A-702D is controlled by the controller. The controller adjusts each blade 702A-702D for the maximum take-off power of the passing ocean or river current. In some embodiments, there may be one or more blades. It will be appreciated that there may be two centers of rotation. In the first center of rotation, each blade 702A-702D has a fixed circular path. In the second center of rotation, the blades 702A-702D may adjust to water current. Due to these adjustments, the system 700 is capable of capturing maximum energy. Furthermore, as the blades 702A-702D rotate, there is an advancing blade that is positioned nearest to the oncoming current while a retreating blade, or blade moving away from the front of the system 700 or away from the oncoming current, has the spoiler 708A-708D that is positioned in a second position so as to make the blade 708A-708D as big as possible. This increases surface area of the retreating blade 702A-702D so that as much water as possible contacts the blade 702A-702D with the extended spoiler 708A-708D. In some embodiments, the spoiler 708A-708D may automatically open when water contacts a trailing edge on the blade 702A-702D. The spoiler 708A-708D may stay open for about 90 degrees of rotation, dramatically increasing the torque on a turbine that is coupled to the blades, thereby creating additional energy.

It will be understood that while various embodiments have been disclosed herein, other embodiments are contemplated. Further, certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure. The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. An energy conversion system comprising:
- a turbine comprising a housing;
- a rotating portion partially positioned in the housing; and
- one or more blades that interact with the rotating portion and are positioned between a lower surface of the housing and an upper surface of a bottom plate, the one or more blades comprising spoilers that are pivotally coupled thereto;
- wherein the spoilers pivot away from an inner surface of the one or more blades and open when rotating away from oncoming current.

2. The energy conversion system of claim 1, further comprising one or more inlet guide veins that are pivotally coupled to and are interposed between the housing and the bottom plate.

3. The energy conversion system of claim 2, wherein the one or more inlet guide veins direct incoming water current to the one or more blades.

4. The energy conversion system of claim 1, further comprising a first rod and a second rod that interact with a first end of the housing, the first rod and the second rod coupleable to a first support.

5. The energy conversion system of claim 1, further comprising a third rod and a fourth rod that interact with a second end of the housing, the third rod and fourth rod coupleable to a second support.

6. The energy conversion system of claim 1, wherein the rotating portion comprises a controller.

7. The energy conversion system of claim 1, wherein the turbine comprises a plurality of support arms that extend from a lower surface of the housing to the bottom plate.

8. The energy conversion system of claim 7, wherein the plurality of support arms surrounds a section of the rotating portion.

9. The energy conversion system of claim 1, wherein the one or more blades couple to the rotating portion via pivot axles.

10. The energy conversion system of claim 2, wherein the one or more inlet guide veins pivot via inlet guide axles to adjust to incoming water current to direct water to the one or more blades.

11. The energy conversion system of claim 1, wherein the one or more spoilers comprise first fingers with first apertures.

12. The energy conversion system of claim 1, wherein the one or more blades comprise second fingers with second apertures.

13. An energy conversion system comprising:
- a rotating portion partially positioned in a housing;
- one or more blades that interact with the rotating portion and are positioned between a lower surface of the housing and an upper surface of a bottom plate, the one or more blades comprising pivotally coupled spoilers that comprise first fingers with first apertures, wherein the first fingers interact with second fingers on an inner surface of the one or more blades;
- one or more pivotable inlet guide veins that couple to and are interposed between the housing and the bottom plate, wherein the one or more inlet guide veins direct incoming water current to the one or more blades; and
- one or more support arms coupled to a lower surface of the housing, at a rear of the housing, at a first end of the one or more supports, the one or more supports extending to and coupled to the upper surface of the bottom plate at a second end of the one or more supports opposite the first end.

14. The energy conversion system of claim 13, further comprising a turbine, the turbine comprising the housing.

15. The energy conversion system of claim 13, wherein the one or more inlet guide veins comprise one or more side inlet guide veins and one or more front inlet guide veins that are adjustable to create optimal pitch angle for incoming water.

16. The energy conversion system of claim 13, wherein the housing comprises one or more generators.

17. The energy conversion system of claim 13, wherein the housing comprises one or more hydraulic pumps.

18. The energy conversion system of claim 13, wherein the one or more blades are rotatable on a vertical axis, the pitch or rotation of each blade being adjusted by a controller.

19. An energy conversion system comprising:
- a first vessel and a second vessel;
- a turbine with a rotating portion interposed between the first vessel and the second vessel;
- one or more blades that interact with the rotating portion and are positioned between a lower surface of the turbine and an upper surface of a bottom plate, the one or more blades comprising pivotally coupled spoilers that comprise first fingers with first apertures, wherein the first fingers interact with second fingers on an inner surface of the one or more blades;
- one or more pivotable inlet guide veins that couple to and are interposed between the housing and the bottom plate, wherein the one or more inlet guide veins direct incoming water current to the one or more blades; and wherein the spoilers pivot away from an inner surface of the one or more blades and open when rotating away from oncoming current.

* * * * *